US012580999B2

(12) United States Patent
Dutta

(10) Patent No.: US 12,580,999 B2
(45) Date of Patent: Mar. 17, 2026

(54) UNIVERSAL LOOP DETECTION IN COMMUNICATION NETWORKS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 611 days.

(21) Appl. No.: 17/982,752

(22) Filed: Nov. 8, 2022

(65) Prior Publication Data

US 2024/0155046 A1     May 9, 2024

(51) Int. Cl.
| *H04L 45/18* | (2022.01) |
| *H04L 45/74* | (2022.01) |
| *H04L 69/16* | (2022.01) |
| *H04L 69/22* | (2022.01) |
| *H04L 69/321* | (2022.01) |

(52) U.S. Cl.
CPC ............ *H04L 69/22* (2013.01); *H04L 69/161* (2013.01); *H04L 69/321* (2013.01)

(58) Field of Classification Search
None
See application file for complete search history.

(56) References Cited

U.S. PATENT DOCUMENTS

| 11,469,995 | B2 | 10/2022 | Dutta | |
| 2007/0153764 | A1* | 7/2007 | Thubert | .................. H04L 45/34 |
| | | | | 370/392 |
| 2012/0207162 | A1* | 8/2012 | Etchegoyen | ............ H04L 45/74 |
| | | | | 370/392 |

(Continued)

FOREIGN PATENT DOCUMENTS

| EP | 2661028 B1 | 9/2015 |
| EP | 3958536 A1 | 2/2022 |

(Continued)

OTHER PUBLICATIONS

Extended European Search Report, 23205685.3-1213, Jan. 26, 2024, 7 pages.

(Continued)

*Primary Examiner* — Duc T Duong
(74) *Attorney, Agent, or Firm* — Tong, Rea, Bentley & Kim, LLC

(57)     ABSTRACT
Various example embodiments for supporting loop detection in a communication network are presented. Various example embodiments for supporting loop detection in a communication network may be configured to support loop detection based on use of a recorded route bit string which may be inserted within packets for enabling detection of loops as the packets are communicated over the communication network. Various example embodiments for supporting loop detection in a communication network may be configured to support loop detection for a packet based on inclusion within the packet of a recorded route bit string having bit positions corresponding to nodes of the communication network where the bit positions may be set in a manner indicative of the nodes which have been traversed by the packet.

24 Claims, 28 Drawing Sheets

(56) References Cited

U.S. PATENT DOCUMENTS

| | | | | |
|---|---|---|---|---|
| 2014/0036908 A1* | 2/2014 | Hui | H04L 45/20 | |
| | | | 370/389 | |
| 2016/0218966 A1* | 7/2016 | Higashinakagawa ... | H04L 45/20 | |
| 2016/0254991 A1* | 9/2016 | Eckert | H04L 45/28 | |
| | | | 370/225 | |
| 2018/0278521 A1* | 9/2018 | Pfister | H04L 69/22 | |
| 2018/0278522 A1* | 9/2018 | Asati | H04L 45/64 | |
| 2018/0287935 A1* | 10/2018 | Wang | H04L 12/4625 | |
| 2018/0367456 A1* | 12/2018 | Wijnands | H04L 12/1854 | |
| 2019/0045034 A1* | 2/2019 | Alam | H04L 12/4645 | |
| 2019/0116114 A1* | 4/2019 | Chen | H04L 45/24 | |
| 2020/0028762 A1* | 1/2020 | Sun | H04L 43/06 | |
| 2021/0021507 A1* | 1/2021 | Eckert | H04L 45/16 | |
| 2021/0092048 A1* | 3/2021 | Dutta | H04L 45/34 | |
| 2022/0094631 A1 | 3/2022 | Dutta | | |
| 2022/0131808 A1* | 4/2022 | Xie | H04L 45/02 | |
| 2022/0166661 A1* | 5/2022 | Dutta | H04L 41/0654 | |
| 2024/0056383 A1* | 2/2024 | Geng | H04L 45/566 | |
| 2024/0163200 A1* | 5/2024 | Chen | H04L 45/64 | |
| 2024/0235986 A1* | 7/2024 | Qin | H04L 45/34 | |

FOREIGN PATENT DOCUMENTS

| | | | |
|---|---|---|---|
| EP | 4007238 A1 | 6/2022 | |
| JP | H06232908 A | 8/1994 | |

OTHER PUBLICATIONS

Communication pursuant to Article 94(3) EPC in corresponding EP Application No. 23 205 685.3-1218, dated Apr. 16, 2025, 4 pages.

Atlas, A., et al, "Basic Specification for IP Fast Reroute: Loop-Free Alternates," Network Working Group, RFC 5286, Sep. 2008, 31 pages.

Shand, M., et al., "A Framework for Loop-Free Convergence," Internet Engineering Task Force (IETF), RFC 5715, Jan. 2010, 22 pages.

Shand, M., et al., "Framework for Loop-Free Convergence Using the Ordered Forwarding Information Base (oFIB) Approach," Jul. 2013, 28 pages.

Postel, J., "Internet Control Message Protocol, DARPA Internet Program, Protocol Specification," Network Working Group, RFC 792, Sep. 1981, 21 pages.

Conta, A., et al., "Internet Control Message Protocol (ICMPv6) for the Internet Protocol Version 6 (IPv6) Specification," Network Working Group, RFC 4443, Mar. 2006, 24 pages.

Katz, D., et al., "Bidirectional Forwarding Detection (BFD) for Multihop Paths," Internet Engineering Task Force (IETF), RFC 5883, Jun. 2010, 6 pages.

Information Sciences Institute, "Internet Protocol, DARPA Internet Program Protocol Specification," Information Sciences Institute of Univ. of So. California, RFC 791, Sep. 1981, 51 pages.

Deering, S., et al., "Internet Protocol, Version 6 (IPv6) Specification," Network Working Group, RFC 2460, Dec. 1998, 39 pages.

Katz, D., "IP Router Alert Option," Network Working Group, RFC 2113, Feb. 1997, 4 pages.

Partridge, C., et al., "IPv6 Router Alert Option," Network Working Group, RFC 2711, Oct. 1999, 6 pages.

Communication pursuant to Article 94(3) EPC in corresponding EP Application No. 23 205 685.3-1218, dated Nov. 25, 2025, 4 pages.

* cited by examiner

PACKET
FORMAT
610

| ~~~~ |
| RR-BITSTRING |
| NATIVE HEADER |
| PAYLOAD |

PACKET
FORMAT
620

| ~~~~ |
| NATIVE HEADER |
| RR-BITSTRING |
| PAYLOAD |

MA-RR-BITSTRING
700

| AREA-ID=1 | AREA-ID=2 | .... | AREA-ID=N | BITSTRING |

MULTI-AREA
PACKET
SWITCHING
NETWORK
800

BITSTRING
HEADER
900

```
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 | Len |              bit string (variable)                      |
 +-+-+-+                                                         +
 ~                                                               ~
 +-+-+-+-+-+-+-+-+-+-+-+-+-+-+-+-+-+-+-+-+-+-+-+-+-+-+-+-+-+-+-+-+
```

MULTI-AREA
BITSTRING
TUPLE
1000

```
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 | Area-ID |          bit string header (variable)               |
 +-+-+-+-+-+                                                     +
 ~                                                               ~
 +-+-+-+-+-+-+-+-+-+-+-+-+-+-+-+-+-+-+-+-+-+-+-+-+-+-+-+-+-+-+-+-+
```

*FIG. 11*

RR-BITSTRING
HEADER
1100

```
+-+-+-+-+-+-+-+-+-+-+-+-+-+-+-+-+-+-+-+-+-+-+-+-+-+-+-+-+-+-+-+
|                        bitstring header                      |
~                       +-+-+-+-+-+-+-+-+-+-+-+-+-+-+-+-+
|                       |              Ethertype              |
+-+-+-+-+-+-+-+-+-+-+-+-+-+-+-+-+-+-+-+-+-+-+-+-+-+-+-+-+-+-+-+
```

*FIG. 14*

RR-BITSTRING
HEADER
1400

```
+-+-+-+-+-+-+-+-+-+-+-+-+-+-+-+-+-+-+-+-+-+-+-+-+-+-+-+-+-+-+-+
|                        bitstring header                      |
~                              +-+-+-+-+-+-+-+
|                              |   Protocol   |
+-+-+-+-+-+-+-+-+-+-+-+-+-+-+-+-+-+-+-+-+-+-+-+-+-+-+-+-+-+-+-+
```

FIG. 12

PACKET
1200

```
    0                    1                    2                    3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |                   Destination MAC Address                    |
   +                              +-+-+-+-+-+-+-+-+-+-+-+-+-+-+-+-+                                          ETHERNET
   |                              |                               |
   +-+-+-+-+-+-+-+-+-+-+-+-+-+-+-+-+                               +
   |                    Source MAC Address                        |
   +-+-+-+-+-+-+-+-+-+-+-+-+-+-+-+-+-+-+-+-+-+-+-+-+-+-+-+-+-+-+-+-+
   ~    ../../                     |            Ethertype          |
   +-+-+-+-+-+-+-+-+-+-+-+-+-+-+-+-+-+-+-+-+-+-+-+-+-+-+-+-+-+-+-+-+
   |                      bitstring header                        |                                          RR-BITSTRING HEADER
   ~                              +-+-+-+-+-+-+-+-+-+-+-+-+-+-+-+-+
   |                              |            Ethertype          |
   +-+-+-+-+-+-+-+-+-+-+-+-+-+-+-+-+-+-+-+-+-+-+-+-+-+-+-+-+-+-+-+-+
   ~                       Native Header                          ~
   +-+-+-+-+-+-+-+-+-+-+-+-+-+-+-+-+-+-+-+-+-+-+-+-+-+-+-+-+-+-+-+-+
   |                                                              |
   ~                          Payload                             ~
   |                                                              |
   +-+-+-+-+-+-+-+-+-+-+-+-+-+-+-+-+-+-+-+-+-+-+-+-+-+-+-+-+-+-+-+-+
```

*FIG. 15*

PACKET
1500

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
~             Data Link Header (e.g Ethernet Header)           ~
+-+-+-+-+-+-+-+-+-+-+-+-+-+-+-+-+-+-+-+-+-+-+-+-+-+-+-+-+-+-+-+-+
|Version|  IHL  |Type of Service|         Total Length          |
+-+-+-+-+-+-+-+-+-+-+-+-+-+-+-+-+-+-+-+-+-+-+-+-+-+-+-+-+-+-+-+-+
|         Identification        |Flags|      Fragment Offset    |
+-+-+-+-+-+-+-+-+-+-+-+-+-+-+-+-+-+-+-+-+-+-+-+-+-+-+-+-+-+-+-+-+
|  Time to Live |    Protocol   |         Header Checksum        |
+-+-+-+-+-+-+-+-+-+-+-+-+-+-+-+-+-+-+-+-+-+-+-+-+-+-+-+-+-+-+-+-+
|                       Source Address                          |
+-+-+-+-+-+-+-+-+-+-+-+-+-+-+-+-+-+-+-+-+-+-+-+-+-+-+-+-+-+-+-+-+
|                     Destination Address                       |
+-+-+-+-+-+-+-+-+-+-+-+-+-+-+-+-+-+-+-+-+-+-+-+-+-+-+-+-+-+-+-+-+
|                       bitstring header                        |
~                                              +-+-+-+-+-+-+-+-+-+
|                                              |  Protocol       |
+-+-+-+-+-+-+-+-+-+-+-+-+-+-+-+-+-+-+-+-+-+-+-+-+-+-+-+-+-+-+-+-+
|                                                               |
~                          Payload                              ~
|                                                               |
+-+-+-+-+-+-+-+-+-+-+-+-+-+-+-+-+-+-+-+-+-+-+-+-+-+-+-+-+-+-+-+-+
```

IPv4

RR-BITSTRING
HEADER

FIG. 16

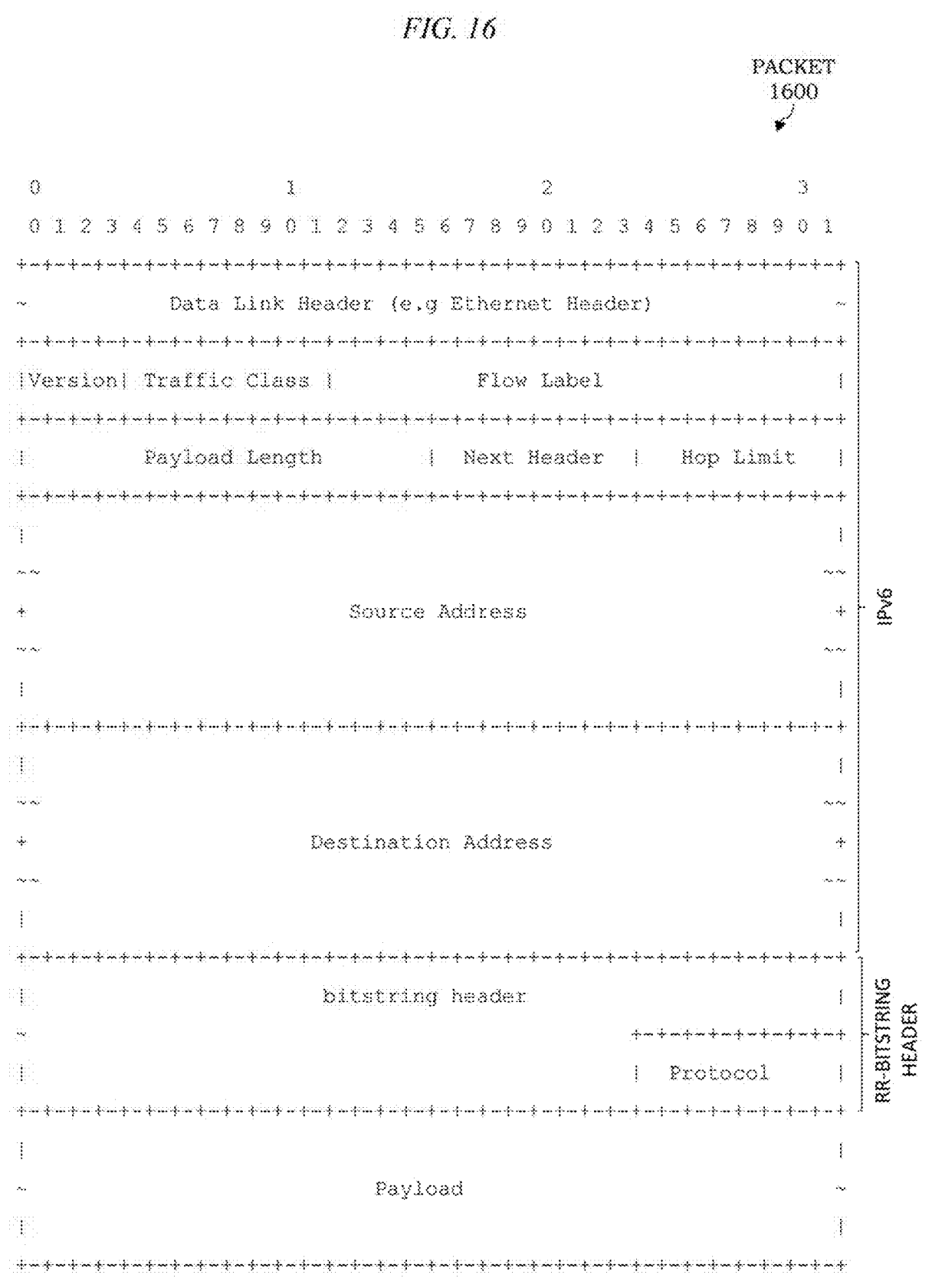

PACKET
1600

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
~              Data Link Header (e.g Ethernet Header)           ~
+-+-+-+-+-+-+-+-+-+-+-+-+-+-+-+-+-+-+-+-+-+-+-+-+-+-+-+-+-+-+-+-+
|Version| Traffic Class |               Flow Label              |
+-+-+-+-+-+-+-+-+-+-+-+-+-+-+-+-+-+-+-+-+-+-+-+-+-+-+-+-+-+-+-+-+
|          Payload Length       |  Next Header  |   Hop Limit   |
+-+-+-+-+-+-+-+-+-+-+-+-+-+-+-+-+-+-+-+-+-+-+-+-+-+-+-+-+-+-+-+-+
|                                                               |
~~                                                             ~~
+                       Source Address                          +
~~                                                             ~~
|                                                               |
+-+-+-+-+-+-+-+-+-+-+-+-+-+-+-+-+-+-+-+-+-+-+-+-+-+-+-+-+-+-+-+-+
|                                                               |
~~                                                             ~~
+                     Destination Address                       +
~~                                                             ~~
|                                                               |
+-+-+-+-+-+-+-+-+-+-+-+-+-+-+-+-+-+-+-+-+-+-+-+-+-+-+-+-+-+-+-+-+
|                     bitstring header                          |
~                                      +-+-+-+-+-+-+-+-+-+-+
|                                      |     Protocol        |
+-+-+-+-+-+-+-+-+-+-+-+-+-+-+-+-+-+-+-+-+-+-+-+-+-+-+-+-+-+-+-+-+
|                                                               |
~                        Payload                                ~
|                                                               |
+-+-+-+-+-+-+-+-+-+-+-+-+-+-+-+-+-+-+-+-+-+-+-+-+-+-+-+-+-+-+-+-+
```

IPv6

RR-BITSTRING HEADER

RR-BITSTRING
HEADER

RR-BITSTRING
OPTION
1800

```
+-+-+-+-+-+-+-+-+-+-+-+-+-+-+-+-+-+-+-+-+-+-+-+-+-+-+-+-+-+-+-+-+
|    Type(159)    |              bitstring header                |
+-+-+-+-+-+-+-+-+-+-+-+-+-+-+-+-+-+-+-+-+-+-+-+-+-+-+-+-+-+-+-+-+
```

COPY  CLASS NUMBER LENGTH DESCRIPTION

----- ----- ------ ------ -----------

1     0    31    var.  RR-bitstring.  Used to detect loops.

*FIG. 19*
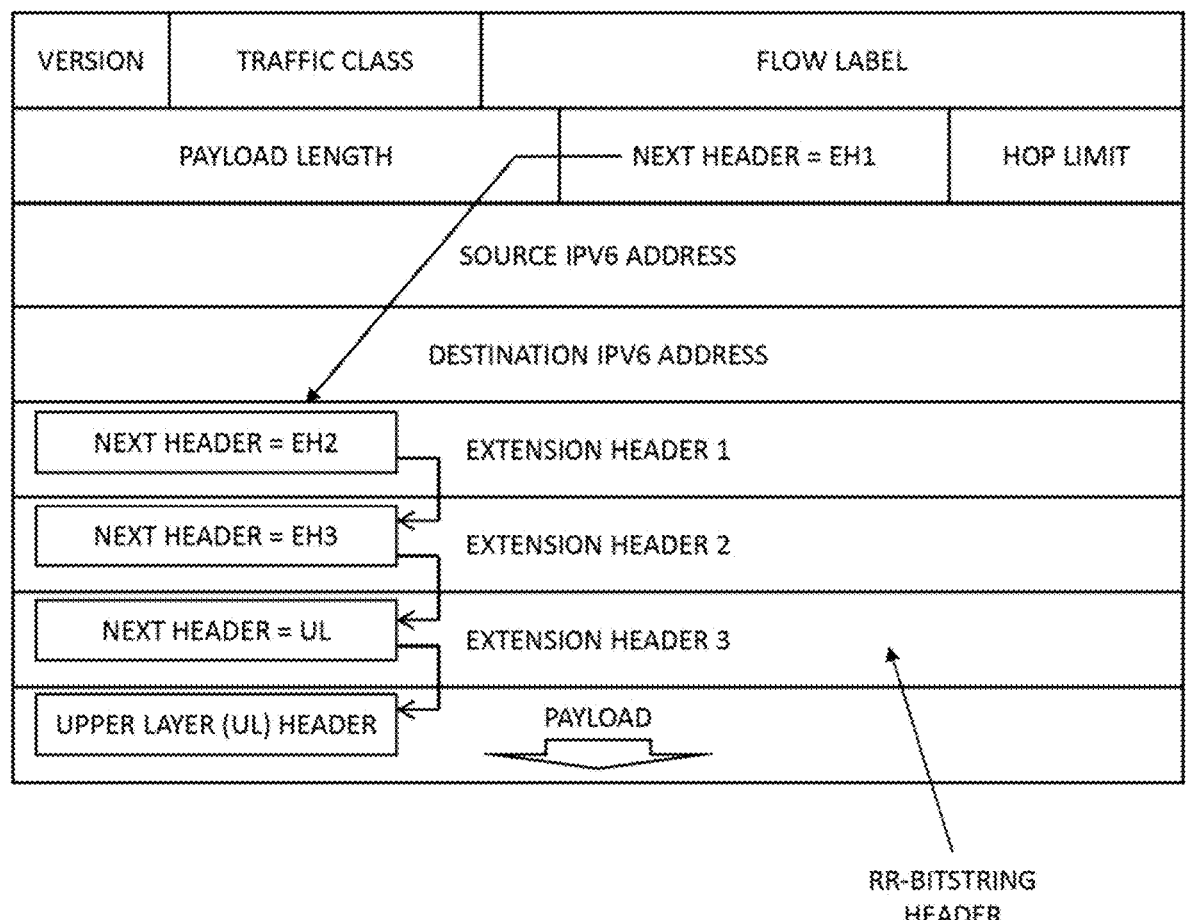

*FIG. 20*

HOP-BY-HOP OPTIONS
HEADER
2000

```
+-+-+-+-+-+-+-+-+-+-+-+-+-+-+-+-+-+-+-+-+-+-+-+-+-+-+-+-+-+-+-+-+
|  Next Header  |  Hdr Ext Len  |                               |
+-+-+-+-+-+-+-+-+-+-+-+-+-+-+-+                                 +
|                                                               |
.                                                               .
.                          Options                              .
.                                                               .
|                                                               |
+-+-+-+-+-+-+-+-+-+-+-+-+-+-+-+-+-+-+-+-+-+-+-+-+-+-+-+-+-+-+-+-+
```

*FIG. 21*

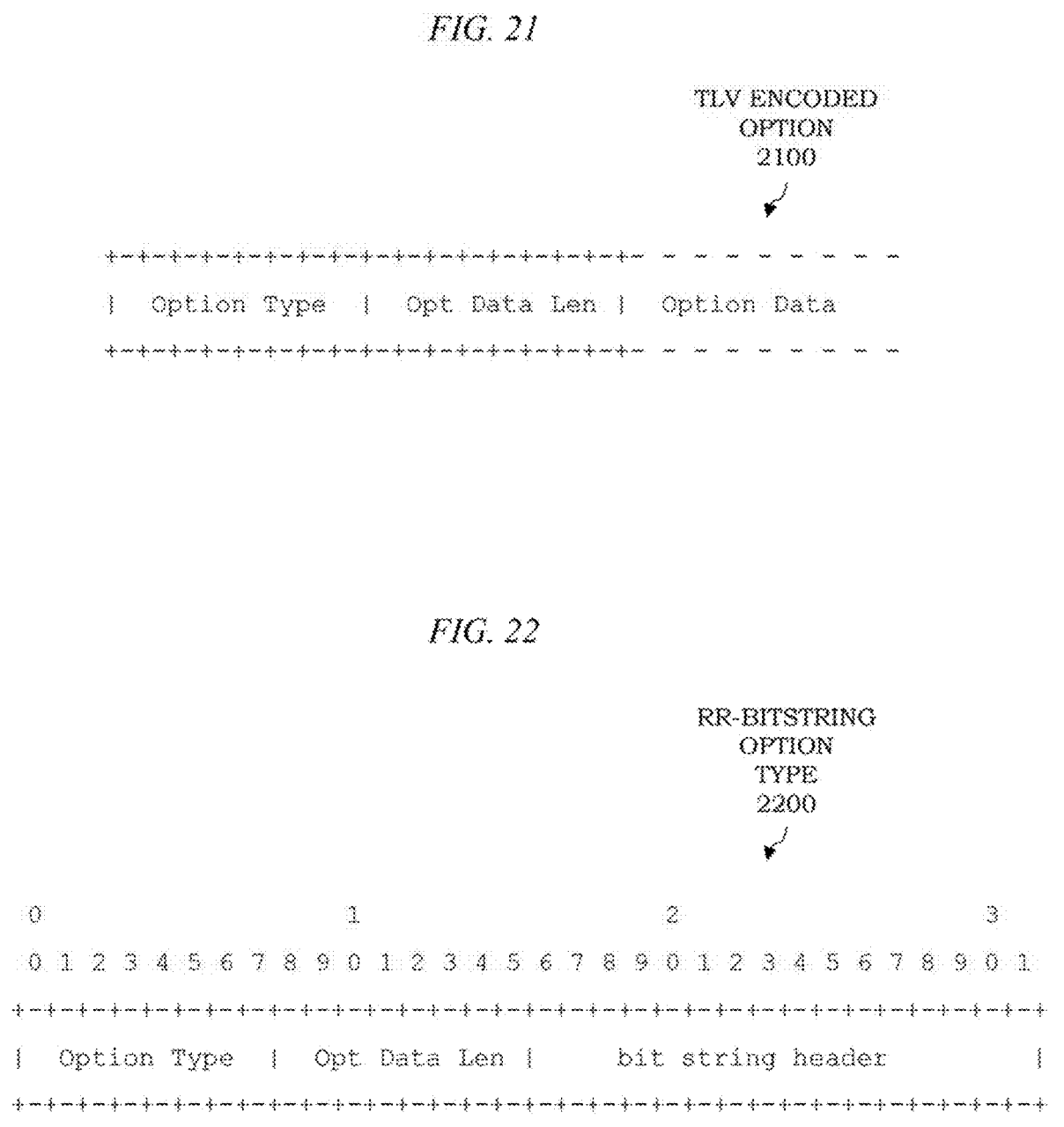

```
                                              TLV ENCODED
                                                OPTION
                                                 2100
                                                  ↙

+-+-+-+-+-+-+-+-+-+-+-+-+-+- - - - - - -
    |  Option Type  |  Opt Data Len |  Option Data
    +-+-+-+-+-+-+-+-+-+-+-+-+-+- - - - - - -
```

*FIG. 22*

```
                                            RR-BITSTRING
                                               OPTION
                                                TYPE
                                                2200
                                                 ↙

0                     1                   2                   3
    0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |  Option Type  |  Opt Data Len |       bit string header       |
    +-+-+-+-+-+-+-+-+-+-+-+-+-+-+-+-+-+-+-+-+-+-+-+-+-+-+-+-+-+-+-+-+
```

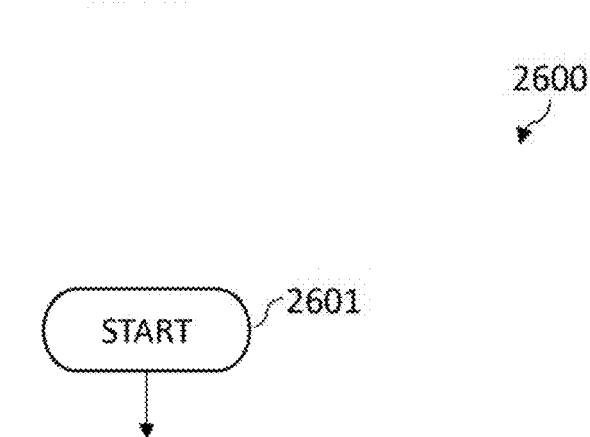

START ⌐2601

SUPPORT COMMUNICATION OF A PACKET WITHIN A
NETWORK INCLUDING A SET OF NODES CONFIGURED
TO OPERATE ON THE PACKET USING A PROTOCOL,
WHEREIN THE PACKET INCLUDES A PAYLOAD AND A
NATIVE HEADER OF THE PROTOCOL, WHEREIN THE
PACKET INCLUDES A RECORDED ROUTE HEADER
INCLUDING A RECORDED ROUTE BIT STRING HAVING A
SET OF BIT POSITIONS ASSOCIATED WITH THE    ⌐2610
RESPECTIVE NODES OF THE NETWORK, WHEREIN THE
BIT POSITIONS OF THE RECORDED ROUTE BIT STRING
ARE SET IN A MANNER INDICATIVE AS TO WHICH OF
THE NODES OF THE NETWORK HAVE BEEN TRAVERSED
BY THE PACKET, WHEREIN THE RECORDED ROUTE
HEADER IS LOCATED WITHIN OR ADJACENT TO THE
NATIVE HEADER OF THE PROTOCOL.

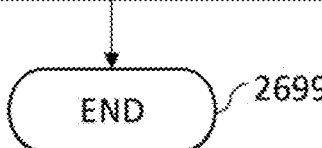

END ⌐2699

*FIG. 27*

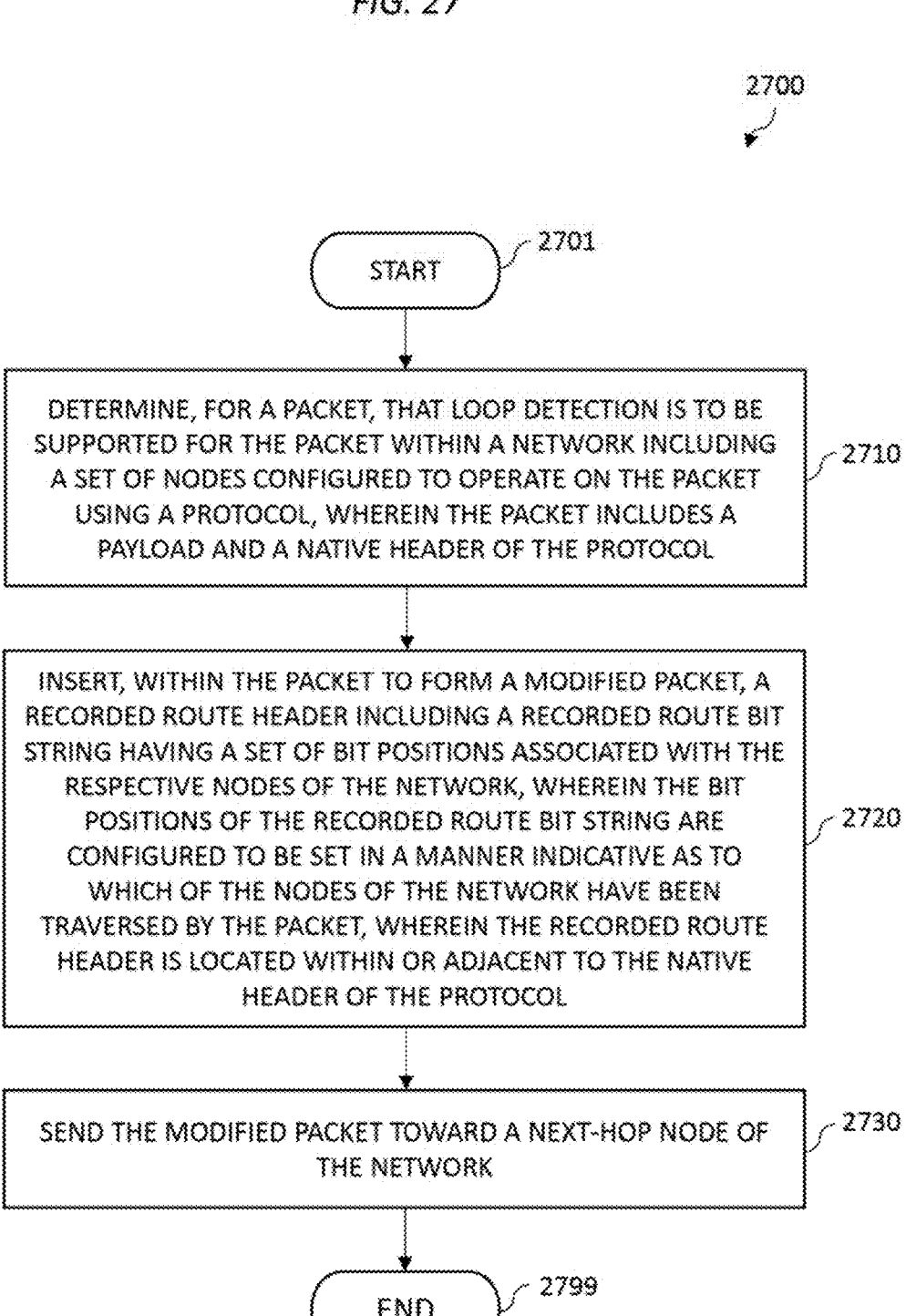

2700

START — 2701

DETERMINE, FOR A PACKET, THAT LOOP DETECTION IS TO BE SUPPORTED FOR THE PACKET WITHIN A NETWORK INCLUDING A SET OF NODES CONFIGURED TO OPERATE ON THE PACKET USING A PROTOCOL, WHEREIN THE PACKET INCLUDES A PAYLOAD AND A NATIVE HEADER OF THE PROTOCOL — 2710

INSERT, WITHIN THE PACKET TO FORM A MODIFIED PACKET, A RECORDED ROUTE HEADER INCLUDING A RECORDED ROUTE BIT STRING HAVING A SET OF BIT POSITIONS ASSOCIATED WITH THE RESPECTIVE NODES OF THE NETWORK, WHEREIN THE BIT POSITIONS OF THE RECORDED ROUTE BIT STRING ARE CONFIGURED TO BE SET IN A MANNER INDICATIVE AS TO WHICH OF THE NODES OF THE NETWORK HAVE BEEN TRAVERSED BY THE PACKET, WHEREIN THE RECORDED ROUTE HEADER IS LOCATED WITHIN OR ADJACENT TO THE NATIVE HEADER OF THE PROTOCOL — 2720

SEND THE MODIFIED PACKET TOWARD A NEXT-HOP NODE OF THE NETWORK — 2730

END — 2799

Figure 28:
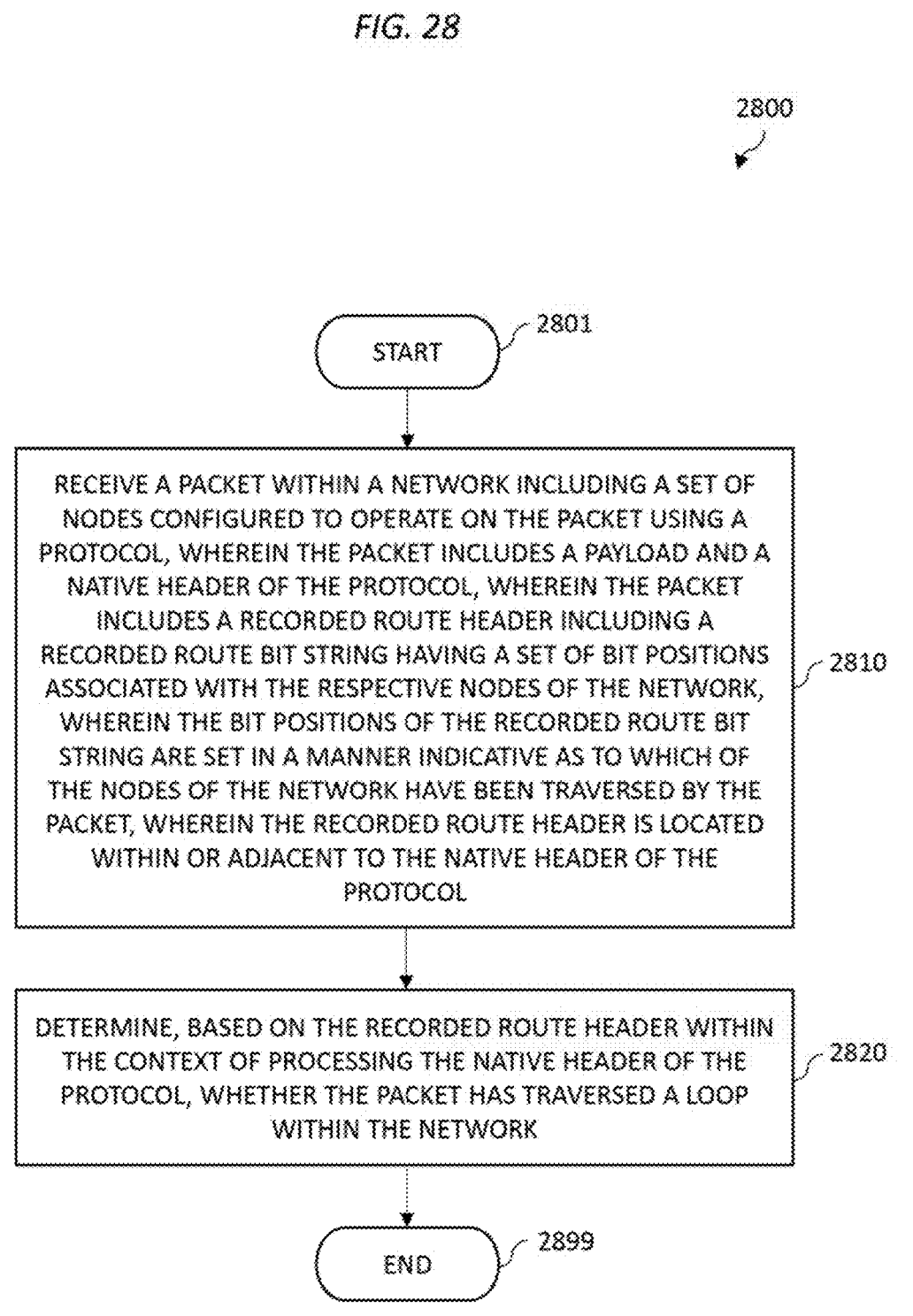

START — 2801

RECEIVE A PACKET WITHIN A NETWORK INCLUDING A SET OF NODES CONFIGURED TO OPERATE ON THE PACKET USING A PROTOCOL, WHEREIN THE PACKET INCLUDES A PAYLOAD AND A NATIVE HEADER OF THE PROTOCOL, WHEREIN THE PACKET INCLUDES A RECORDED ROUTE HEADER INCLUDING A RECORDED ROUTE BIT STRING HAVING A SET OF BIT POSITIONS ASSOCIATED WITH THE RESPECTIVE NODES OF THE NETWORK, WHEREIN THE BIT POSITIONS OF THE RECORDED ROUTE BIT STRING ARE SET IN A MANNER INDICATIVE AS TO WHICH OF THE NODES OF THE NETWORK HAVE BEEN TRAVERSED BY THE PACKET, WHEREIN THE RECORDED ROUTE HEADER IS LOCATED WITHIN OR ADJACENT TO THE NATIVE HEADER OF THE PROTOCOL — 2810

DETERMINE, BASED ON THE RECORDED ROUTE HEADER WITHIN THE CONTEXT OF PROCESSING THE NATIVE HEADER OF THE PROTOCOL, WHETHER THE PACKET HAS TRAVERSED A LOOP WITHIN THE NETWORK — 2820

END — 2899

*FIG. 29*

2900

2901

SUPPORT COMMUNICATION OF A PACKET WITHIN A
NETWORK, WHEREIN THE NETWORK INCLUDES A SET
OF AREAS INCLUDING RESPECTIVE SETS OF NODES,
WHEREIN THE PACKET INCLUDES A RECORDED ROUTE
HEADER, WHEREIN THE RECORDED ROUTE HEADER
INCLUDES A FIRST AREA IDENTIFIER OF A FIRST ONE OF
THE AREAS TRAVERSED BY THE PACKET, WHEREIN THE
RECORDED ROUTE HEADER INCLUDES A SECOND AREA
IDENTIFIER OF A SECOND ONE OF THE AREAS
CURRENTLY BEING TRAVERSED BY THE PACKET,
WHEREIN THE RECORDED ROUTE HEADER INCLUDES A
RECORDED ROUTE BIT STRING HAVING A SET OF BIT
POSITIONS ASSOCIATED WITH THE RESPECTIVE NODES
IN THE SET OF NODES OF THE SECOND ONE OF THE
AREAS, WHEREIN THE BIT POSITIONS OF THE
RECORDED ROUTE BIT STRING ARE SET IN A MANNER
INDICATIVE AS TO WHICH OF THE NODES IN THE SET
OF NODES OF THE SECOND ONE OF THE AREAS HAVE
BEEN TRAVERSED BY THE PACKET

2910

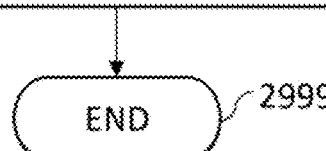
2999

UNIVERSAL LOOP DETECTION IN COMMUNICATION NETWORKS

TECHNICAL FIELD

Various example embodiments relate generally to communication systems and, more particularly but not exclusively, to loop detection in communication systems.

BACKGROUND

In communication networks, various communications technologies may be used to support various types of communications.

SUMMARY

In at least some example embodiments, an apparatus includes at least one processor and at least one memory storing instructions that, when executed by the at least one processor, cause the apparatus to receive a packet within a network including a set of nodes configured to operate on the packet using a protocol, wherein the packet includes a payload and a native header of the protocol, wherein the packet includes a recorded route header including a recorded route bit string having a set of bit positions associated with the respective nodes of the network, wherein the bit positions of the recorded route bit string are set in a manner indicative as to which of the nodes of the network have been traversed by the packet, wherein the recorded route header is located within or adjacent to the native header of the protocol and determine, based on the recorded route header within the context of processing the native header of the protocol, whether the packet has traversed a loop within the network. In at least some example embodiments, the recorded route header is located adjacent to the native header of the protocol. In at least some example embodiments, the recorded route header is located above the payload and below the native header of the protocol. In at least some example embodiments, the recorded route header is located above the payload and above the native header of the protocol. In at least some example embodiments, the recorded route header is located within the native header. In at least some example embodiments, the protocol is a layer 3 protocol or a layer 2.5 protocol, and the recorded route header is located above the native header of the protocol. In at least some example embodiments, the packet further includes a layer 2 protocol header above the recorded route header. In at least some example embodiments, the packet further includes an Ethernet header above the recorded route header, and an Ethertype field of the Ethernet header is configured to indicate a presence of the recorded route header below the Ethernet header. In at least some example embodiments, the recorded route header includes a bitstring header field encoding the recorded route bitstring and an Ethernet type field configured to indicate a presence of the native header of the protocol below the recorded route header. In at least some example embodiments, the protocol is Ethernet and the native header is an Ethernet header, and an Ethertype field of the Ethernet header is configured to indicate a presence of the recorded route header below the Ethernet header. In at least some example embodiments, the recorded route header includes a bitstring header field encoding the recorded route bitstring and an Ethernet type field configured to indicate a presence of the payload below the recorded route header. In at least some example embodiments, the protocol is an Internet Protocol (IP), and the recorded route header is located within an IP Header. In at least some example embodiments, the protocol is IP version 4 (IPv4), and the recorded route header is located within an IPv4 Option of the IPv4 Header. In at least some example embodiments, the IPv4 Header includes a Protocol field configured to indicate a presence of the recorded route header within the IPv4 Header. In at least some example embodiments, the protocol is IP version 6 (IPv6), and the recorded route header is located within an IPv6 Extension Header of the IPv6 Header. In at least some example embodiments, the IPv6 Header includes a Next Header field configured to indicate a presence of the recorded route header within the IPv6 Header. In at least some example embodiments, the recorded route header includes a bitstring header field encoding the recorded route bitstring and a Protocol field configured to indicate a type of an upper layer header in the payload. In at least some example embodiments, the type of the upper layer header in the payload includes one of Transmission Control Protocol (TCP), User Datagram Protocol (UDP), or Internet Control Message Protocol. In at least some example embodiments, the recorded route header includes a bit string field encoding the recorded route bitstring and a length field encoding an indication of a length of the bit string field. In at least some example embodiments, to determine whether the packet has traversed a loop within the network, the instructions, when executed by the at least one processor, cause the apparatus at least to perform, by one of the nodes that received the packet based on the recorded route header and a node bitstring configured to indicate a bit position of the one of the nodes within the recorded route header, a logical operation to determine whether the packet previously traversed the one of the nodes. In at least some example embodiments, the instructions, when executed by the at least one processor, cause the apparatus at least to support, based on a determination that the packet has not traversed a loop within the network, forwarding of the packet based on the native header of the protocol. In at least some example embodiments, the instructions, when executed by the at least one processor, cause the apparatus at least to initiate, based on a determination that the packet has not traversed a loop within the network, an action configured to prevent further looping of the packet within the network.

In at least some example embodiments, a non-transitory computer readable medium includes program instructions that, when executed by an apparatus, cause the apparatus at least to receive a packet within a network including a set of nodes configured to operate on the packet using a protocol, wherein the packet includes a payload and a native header of the protocol, wherein the packet includes a recorded route header including a recorded route bit string having a set of bit positions associated with the respective nodes of the network, wherein the bit positions of the recorded route bit string are set in a manner indicative as to which of the nodes of the network have been traversed by the packet, wherein the recorded route header is located within or adjacent to the native header of the protocol and determine, based on the recorded route header within the context of processing the native header of the protocol, whether the packet has traversed a loop within the network. In at least some example embodiments, the recorded route header is located adjacent to the native header of the protocol. In at least some example embodiments, the recorded route header is located above the payload and below the native header of the protocol. In at least some example embodiments, the recorded route header is located above the payload and above the native header of the protocol. In at least some example embodiments, the recorded route header is located within the native header. In at least some example embodiments, the protocol is a layer 3 protocol or a layer 2.5 protocol, and the recorded route header is located above the native header of the protocol. In at least some example embodiments, the packet further includes a layer 2 protocol header above the recorded route header. In at least some example embodiments, the packet further includes an Ethernet header above the recorded route header, and an Ethertype field of the Ethernet header is configured to indicate a presence of the recorded route header below the Ethernet header. In at least some example embodiments, the recorded route header includes a bitstring header field encoding the recorded route bitstring and an Ethernet type field configured to indicate a presence of the native header of the protocol below the recorded route header. In at least some example embodiments, the protocol is Ethernet and the native header is an Ethernet header, and an Ethertype field of the Ethernet header is configured to indicate a presence of the recorded route header below the Ethernet header. In at least some example embodiments, the recorded route header includes a bitstring header field encoding the recorded route bitstring and an Ethernet type field configured to indicate a presence of the payload below the recorded route header. In at least some example embodiments, the protocol is an Internet Protocol (IP), and the recorded route header is located within an IP Header. In at least some example embodiments, the protocol is IP version 4 (IPv4), and the recorded route header is located within an IPv4 Option of the IPv4 Header. In at least some example embodiments, the IPv4 Header includes a Protocol field configured to indicate a presence of the recorded route header within the IPv4 Header. In at least some example embodiments, the protocol is IP version 6 (IPv6), and the recorded route header is located within an IPv6 Extension Header of the IPv6 Header. In at least some example embodiments, the IPv6 Header includes a Next Header field configured to indicate a presence of the recorded route header within the IPv6 Header. In at least some example embodiments, the recorded route header includes a bitstring header field encoding the recorded route bitstring and a Protocol field configured to indicate a type of an upper layer header in the payload. In at least some example embodiments, the type of the upper layer header in the payload includes one of Transmission Control Protocol (TCP), User Datagram Protocol (UDP), or Internet Control Message Protocol. In at least some example embodiments, the recorded route header includes a bit string field encoding the recorded route bitstring and a length field encoding an indication of a length of the bit string field. In at least some example embodiments, to determine whether the packet has traversed a loop within the network, the program instructions, when executed by the apparatus, cause the apparatus at least to perform, by one of the nodes that received the packet based on the recorded route header and a node bitstring configured to indicate a bit position of the one of the nodes within the recorded route header, a logical operation to determine whether the packet previously traversed the one of the nodes. In at least some example embodiments, the program instructions, when executed by the apparatus, cause the apparatus at least to support, based on a determination that the packet has not traversed a loop within the network, forwarding of the packet based on the native header of the protocol. In at least some example embodiments, the program instructions, when executed by the apparatus, cause the apparatus at least to initiate, based on a determination that the packet has not traversed a loop within the network, an action configured to prevent further looping of the packet within the network.

In at least some example embodiments, a method includes receiving a packet within a network including a set of nodes configured to operate on the packet using a protocol, wherein the packet includes a payload and a native header of the protocol, wherein the packet includes a recorded route header including a recorded route bit string having a set of bit positions associated with the respective nodes of the network, wherein the bit positions of the recorded route bit string are set in a manner indicative as to which of the nodes of the network have been traversed by the packet, wherein the recorded route header is located within or adjacent to the native header of the protocol and determining, based on the recorded route header within the context of processing the native header of the protocol, whether the packet has traversed a loop within the network. In at least some example embodiments, the recorded route header is located adjacent to the native header of the protocol. In at least some example embodiments, the recorded route header is located above the payload and below the native header of the protocol. In at least some example embodiments, the recorded route header is located above the payload and above the native header of the protocol. In at least some example embodiments, the recorded route header is located within the native header. In at least some example embodiments, the protocol is a layer 3 protocol or a layer 2.5 protocol, and the recorded route header is located above the native header of the protocol. In at least some example embodiments, the packet further includes a layer 2 protocol header above the recorded route header. In at least some example embodiments, the packet further includes an Ethernet header above the recorded route header, and an Ethertype field of the Ethernet header is configured to indicate a presence of the recorded route header below the Ethernet header. In at least some example embodiments, the recorded route header includes a bitstring header field encoding the recorded route bitstring and an Ethernet type field configured to indicate a presence of the native header of the protocol below the recorded route header. In at least some example embodiments, the protocol is Ethernet and the native header is an Ethernet header, and an Ethertype field of the Ethernet header is configured to indicate a presence of the recorded route header below the Ethernet header. In at least some example embodiments, the recorded route header includes a bitstring header field encoding the recorded route bitstring and an Ethernet type field configured to indicate a presence of the payload below the recorded route header. In at least some example embodiments, the protocol is an Internet Protocol (IP), and the recorded route header is located within an IP Header. In at least some example embodiments, the protocol is IP version 4 (IPv4), and the recorded route header is located within an IPv4 Option of the IPv4 Header. In at least some example embodiments, the IPv4 Header includes a Protocol field configured to indicate a presence of the recorded route header within the IPv4 Header. In at least some example embodiments, the protocol is IP version 6 (IPv6), and the recorded route header is located within an IPv6 Extension Header of the IPv6 Header. In at least some example embodiments, the IPv6 Header includes a Next Header field configured to indicate a presence of the recorded route header within the IPv6 Header. In at least some example embodiments, the recorded route header includes a bitstring header field encoding the recorded route bitstring and a Protocol field configured to indicate a type of an upper layer header in the payload. In at least some example embodiments, the type of the upper layer header in the payload includes one of Transmission Control Protocol (TCP), User Datagram Protocol (UDP), or Internet Control Message Protocol. In at least some example embodiments, the recorded route header includes a bit string field encoding the recorded route bitstring and a length field encoding an indication of a length of the bit string field. In at least some example embodiments, determining whether the packet has traversed a loop within the network includes performing, by one of the nodes that received the packet based on the recorded route header and a node bitstring configured to indicate a bit position of the one of the nodes within the recorded route header, a logical operation to determine whether the packet previously traversed the one of the nodes. In at least some example embodiments, the method includes supporting, based on a determination that the packet has not traversed a loop within the network, forwarding of the packet based on the native header of the protocol. In at least some example embodiments, the method includes initiating, based on a determination that the packet has not traversed a loop within the network, an action configured to prevent further looping of the packet within the network.

In at least some example embodiments, an apparatus includes means for receiving a packet within a network including a set of nodes configured to operate on the packet using a protocol, wherein the packet includes a payload and a native header of the protocol, wherein the packet includes a recorded route header including a recorded route bit string having a set of bit positions associated with the respective nodes of the network, wherein the bit positions of the recorded route bit string are set in a manner indicative as to which of the nodes of the network have been traversed by the packet, wherein the recorded route header is located within or adjacent to the native header of the protocol and means for determining, based on the recorded route header within the context of processing the native header of the protocol, whether the packet has traversed a loop within the network. In at least some example embodiments, the recorded route header is located adjacent to the native header of the protocol. In at least some example embodiments, the recorded route header is located above the payload and below the native header of the protocol. In at least some example embodiments, the recorded route header is located above the payload and above the native header of the protocol. In at least some example embodiments, the recorded route header is located within the native header. In at least some example embodiments, the protocol is a layer 3 protocol or a layer 2.5 protocol, and the recorded route header is located above the native header of the protocol. In at least some example embodiments, the packet further includes a layer 2 protocol header above the recorded route header. In at least some example embodiments, the packet further includes an Ethernet header above the recorded route header, and an Ethertype field of the Ethernet header is configured to indicate a presence of the recorded route header below the Ethernet header. In at least some example embodiments, the recorded route header includes a bitstring header field encoding the recorded route bitstring and an Ethernet type field configured to indicate a presence of the native header of the protocol below the recorded route header. In at least some example embodiments, the protocol is Ethernet and the native header is an Ethernet header, and an Ethertype field of the Ethernet header is configured to indicate a presence of the recorded route header below the Ethernet header. In at least some example embodiments, the recorded route header includes a bitstring header field encoding the recorded route bitstring and an Ethernet type field configured to indicate a presence of the payload below the recorded route header. In at least some example embodiments, the protocol is an Internet Protocol (IP), and the recorded route header is located within an IP Header. In at least some example embodiments, the protocol is IP version 4 (IPv4), and the recorded route header is located within an IPv4 Option of the IPv4 Header. In at least some example embodiments, the IPv4 Header includes a Protocol field configured to indicate a presence of the recorded route header within the IPv4 Header. In at least some example embodiments, the protocol is IP version 6 (IPv6), and the recorded route header is located within an IPv6 Extension Header of the IPv6 Header. In at least some example embodiments, the IPv6 Header includes a Next Header field configured to indicate a presence of the recorded route header within the IPv6 Header. In at least some example embodiments, the recorded route header includes a bitstring header field encoding the recorded route bitstring and a Protocol field configured to indicate a type of an upper layer header in the payload. In at least some example embodiments, the type of the upper layer header in the payload includes one of Transmission Control Protocol (TCP), User Datagram Protocol (UDP), or Internet Control Message Protocol. In at least some example embodiments, the recorded route header includes a bit string field encoding the recorded route bitstring and a length field encoding an indication of a length of the bit string field. In at least some example embodiments, the means for determining whether the packet has traversed a loop within the network includes means for performing, by one of the nodes that received the packet based on the recorded route header and a node bitstring configured to indicate a bit position of the one of the nodes within the recorded route header, a logical operation to determine whether the packet previously traversed the one of the nodes. In at least some example embodiments, the apparatus includes means for supporting, based on a determination that the packet has not traversed a loop within the network, forwarding of the packet based on the native header of the protocol. In at least some example embodiments, the apparatus includes means for initiating, based on a determination that the packet has not traversed a loop within the network, an action configured to prevent further looping of the packet within the network.

In at least some example embodiments, an apparatus includes at least one processor and at least one memory storing instructions that, when executed by the at least one processor, cause the apparatus at least to support communication of a packet within a network including a set of nodes configured to operate on the packet using a protocol, wherein the packet includes a payload and a native header of the protocol, wherein the packet includes a recorded route header including a recorded route bit string having a set of bit positions associated with the respective nodes of the network, wherein the bit positions of the recorded route bit string are set in a manner indicative as to which of the nodes of the network have been traversed by the packet, wherein the recorded route header is located within or adjacent to the native header of the protocol. In at least some example embodiments, a non-transitory computer readable medium includes program instructions that, when executed by an apparatus, cause the apparatus at least to support communication of a packet within a network including a set of nodes configured to operate on the packet using a protocol, wherein the packet includes a payload and a native header of the protocol, wherein the packet includes a recorded route header including a recorded route bit string having a set of bit positions associated with the respective nodes of the network, wherein the bit positions of the recorded route bit string are set in a manner indicative as to which of the nodes of the network have been traversed by the packet, wherein the recorded route header is located within or adjacent to the native header of the protocol. In at least some example embodiments, a method includes supporting communication of a packet within a network including a set of nodes configured to operate on the packet using a protocol, wherein the packet includes a payload and a native header of the protocol, wherein the packet includes a recorded route header including a recorded route bit string having a set of bit positions associated with the respective nodes of the network, wherein the bit positions of the recorded route bit string are set in a manner indicative as to which of the nodes of the network have been traversed by the packet, wherein the recorded route header is located within or adjacent to the native header of the protocol. In at least some example embodiments, an apparatus includes means for supporting communication of a packet within a network including a set of nodes configured to operate on the packet using a protocol, wherein the packet includes a payload and a native header of the protocol, wherein the packet includes a recorded route header including a recorded route bit string having a set of bit positions associated with the respective nodes of the network, wherein the bit positions of the recorded route bit string are set in a manner indicative as to which of the nodes of the network have been traversed by the packet, wherein the recorded route header is located within or adjacent to the native header of the protocol.

In at least some example embodiments, an apparatus includes at least one processor and at least one memory storing instructions that, when executed by the at least one processor, cause the apparatus at least to receive, at a node configured to operate as an egress point from a first area of a network to a second area of the network, a packet including a recorded route header, wherein the recorded route header includes an area identifier of the first area and a recorded route bitstring having a set of bit positions associated with a respective subset of nodes of the network included within the first area, wherein the bit positions of the bit string are set in a manner indicative as to which of the nodes of the first area have been traversed by the packet, update, by the node, the recorded route header of the packet to form a modified packet, wherein the update of the recorded route header includes removing the recorded route bitstring from the recorded route header, and send, by the node toward a next-hop node of the second area, the modified packet. In at least some example embodiments, a non-transitory computer readable medium includes program instructions that, when executed by an apparatus, cause the apparatus at least to receive, at a node configured to operate as an egress point from a first area of a network to a second area of the network, a packet including a recorded route header, wherein the recorded route header includes an area identifier of the first area and a recorded route bitstring having a set of bit positions associated with a respective subset of nodes of the network included within the first area, wherein the bit positions of the bit string are set in a manner indicative as to which of the nodes of the first area have been traversed by the packet, update, by the node, the recorded route header of the packet to form a modified packet, wherein the update of the recorded route header includes removing the recorded route bitstring from the recorded route header, and send, by the node toward a next-hop node of the second area, the modified packet. In at least some example embodiments, a method includes receiving, at a node configured to operate as an egress point from a first area of a network to a second area of the network, a packet including a recorded route header, wherein the recorded route header includes an area identifier of the first area and a recorded route bitstring having a set of bit positions associated with a respective subset of nodes of the network included within the first area, wherein the bit positions of the bit string are set in a manner indicative as to which of the nodes of the first area have been traversed by the packet, updating, by the node, the recorded route header of the packet to form a modified packet, wherein the update of the recorded route header includes removing the recorded route bitstring from the recorded route header, and sending, by the node toward a next-hop node of the second area, the modified packet. In at least some example embodiments, an apparatus includes means for receiving, at a node configured to operate as an egress point from a first area of a network to a second area of the network, a packet including a recorded route header, wherein the recorded route header includes an area identifier of the first area and a recorded route bitstring having a set of bit positions associated with a respective subset of nodes of the network included within the first area, wherein the bit positions of the bit string are set in a manner indicative as to which of the nodes of the first area have been traversed by the packet, means for updating, by the node, the recorded route header of the packet to form a modified packet, wherein the update of the recorded route header includes removing the recorded route bitstring from the recorded route header, and means for sending, by the node toward a next-hop node of the second area, the modified packet.

In at least some example embodiments, an apparatus includes at least one processor and at least one memory storing instructions that, when executed by the at least one processor, cause the apparatus at least to receive, from an upstream node in a first area of a network by a node configured to operate as an ingress point into a second area of the network, a packet including a recorded route header, wherein the recorded route header includes a first area identifier of the first area of the network, update, by the node, the recorded route header of the packet to form a modified packet, wherein the update of the recorded route header includes inserting a second area identifier of the second area and inserting a recorded route bitstring having a set of bit positions associated with a respective subset of nodes of the network included within the second area, wherein the bit position of the bit string corresponding to the node is set in a manner indicative that the packet has traversed the node, and send, by the node toward a next-hop node of the second area, the modified packet. In at least some example embodiments, a non-transitory computer readable medium includes program instructions that, when executed by an apparatus, cause the apparatus at least to receive, from an upstream node in a first area of a network by a node configured to operate as an ingress point into a second area of the network, a packet including a recorded route header, wherein the recorded route header includes a first area identifier of the first area of the network, update, by the node, the recorded route header of the packet to form a modified packet, wherein the update of the recorded route header includes inserting a second area identifier of the second area and inserting a recorded route bitstring having a set of bit positions associated with a respective subset of nodes of the network included within the second area, wherein the bit position of the bit string corresponding to the node is set in a manner indicative that the packet has traversed the node, and send, by the node toward a next-hop node of the second area, the modified packet. In at least some example embodiments, a method includes receiving, from an upstream node in a first area of a network by a node configured to operate as an ingress point into a second area of the network, a packet including a recorded route header, wherein the recorded route header includes a first area identifier of the first area of the network, updating, by the node, the recorded route header of the packet to form a modified packet, wherein the update of the recorded route header includes inserting a second area identifier of the second area and inserting a recorded route bitstring having a set of bit positions associated with a respective subset of nodes of the network included within the second area, wherein the bit position of the bit string corresponding to the node is set in a manner indicative that the packet has traversed the node, and sending, by the node toward a next-hop node of the second area, the modified packet. In at least some example embodiments, an apparatus includes means for receiving, from an upstream node in a first area of a network by a node configured to operate as an ingress point into a second area of the network, a packet including a recorded route header, wherein the recorded route header includes a first area identifier of the first area of the network, means for updating, by the node, the recorded route header of the packet to form a modified packet, wherein the update of the recorded route header includes inserting a second area identifier of the second area and inserting a recorded route bitstring having a set of bit positions associated with a respective subset of nodes of the network included within the second area, wherein the bit position of the bit string corresponding to the node is set in a manner indicative that the packet has traversed the node, and means for sending, by the node toward a next-hop node of the second area, the modified packet.

BRIEF DESCRIPTION OF THE DRAWINGS

The teachings herein can be readily understood by considering the following detailed description in conjunction with the accompanying drawings, in which.

10

Figures 9, 10:
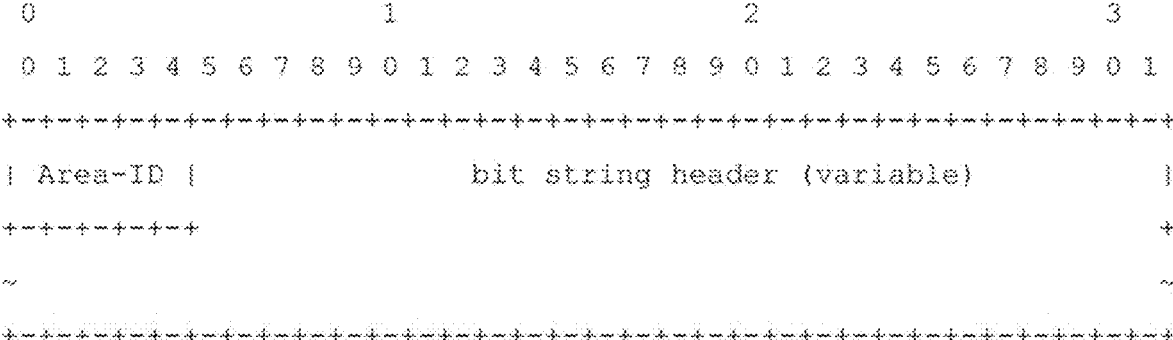
FIG. 9 depicts an example embodiment of a bitstring header configured for use as the bitstring portion of an RR-bitstring or an MA-RR-bitstring.
Figure 13:
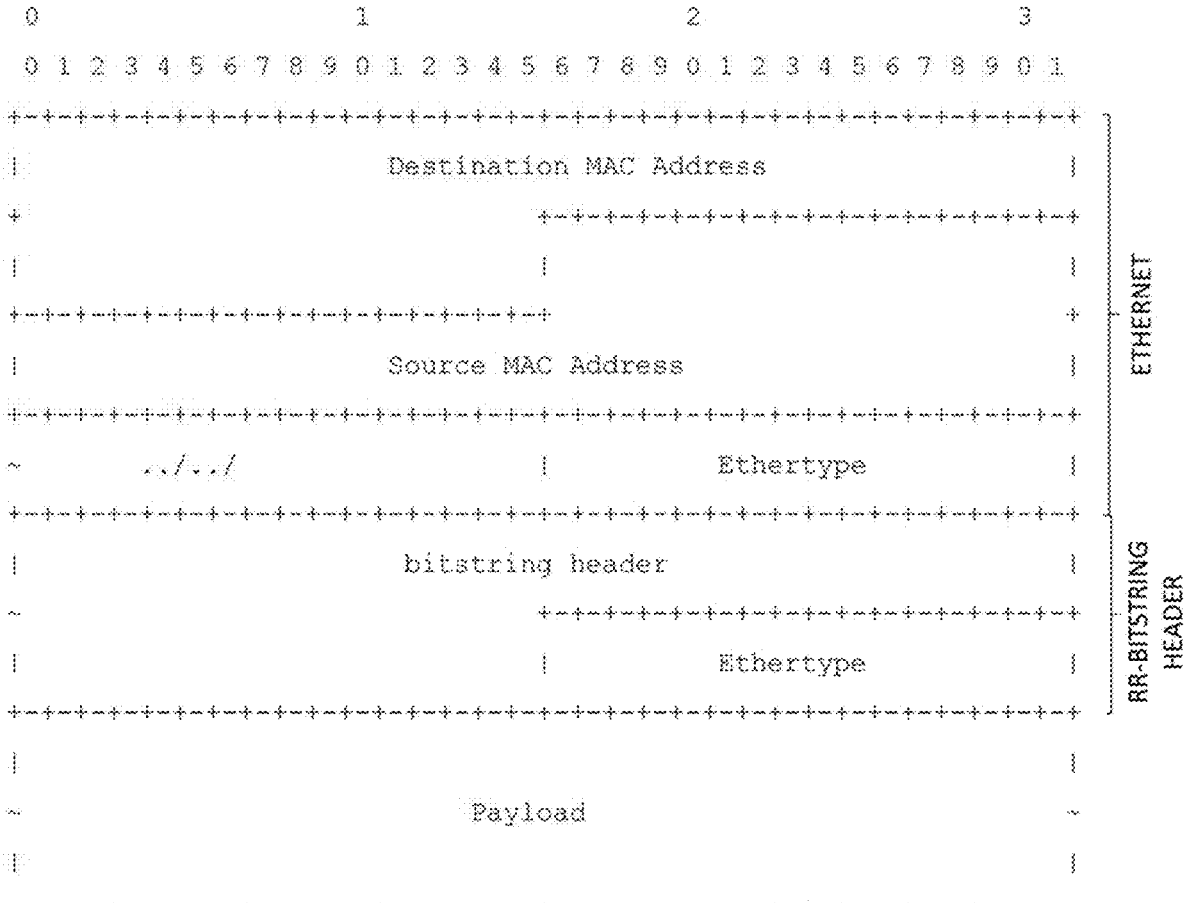
Figure 17:
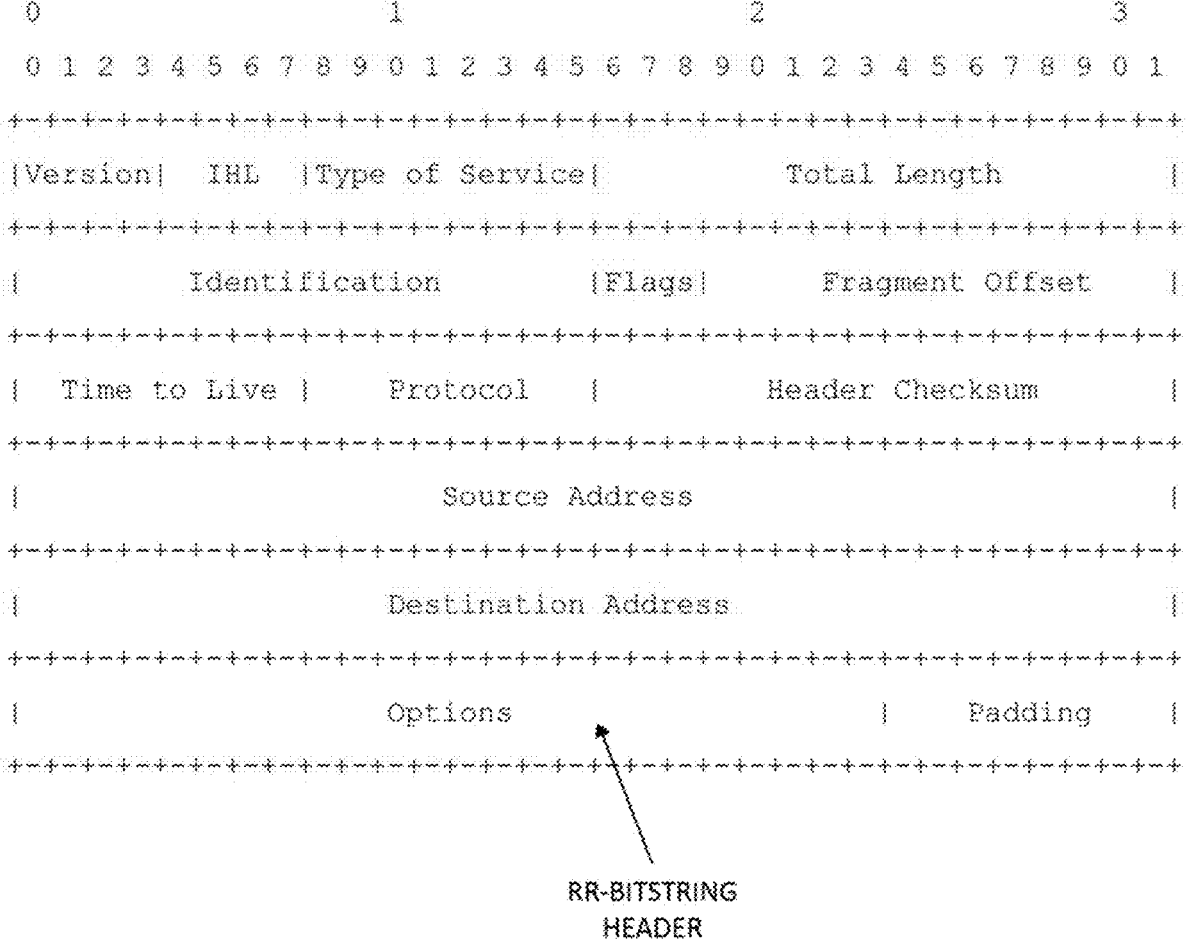
Figure 18:
Figure 23:
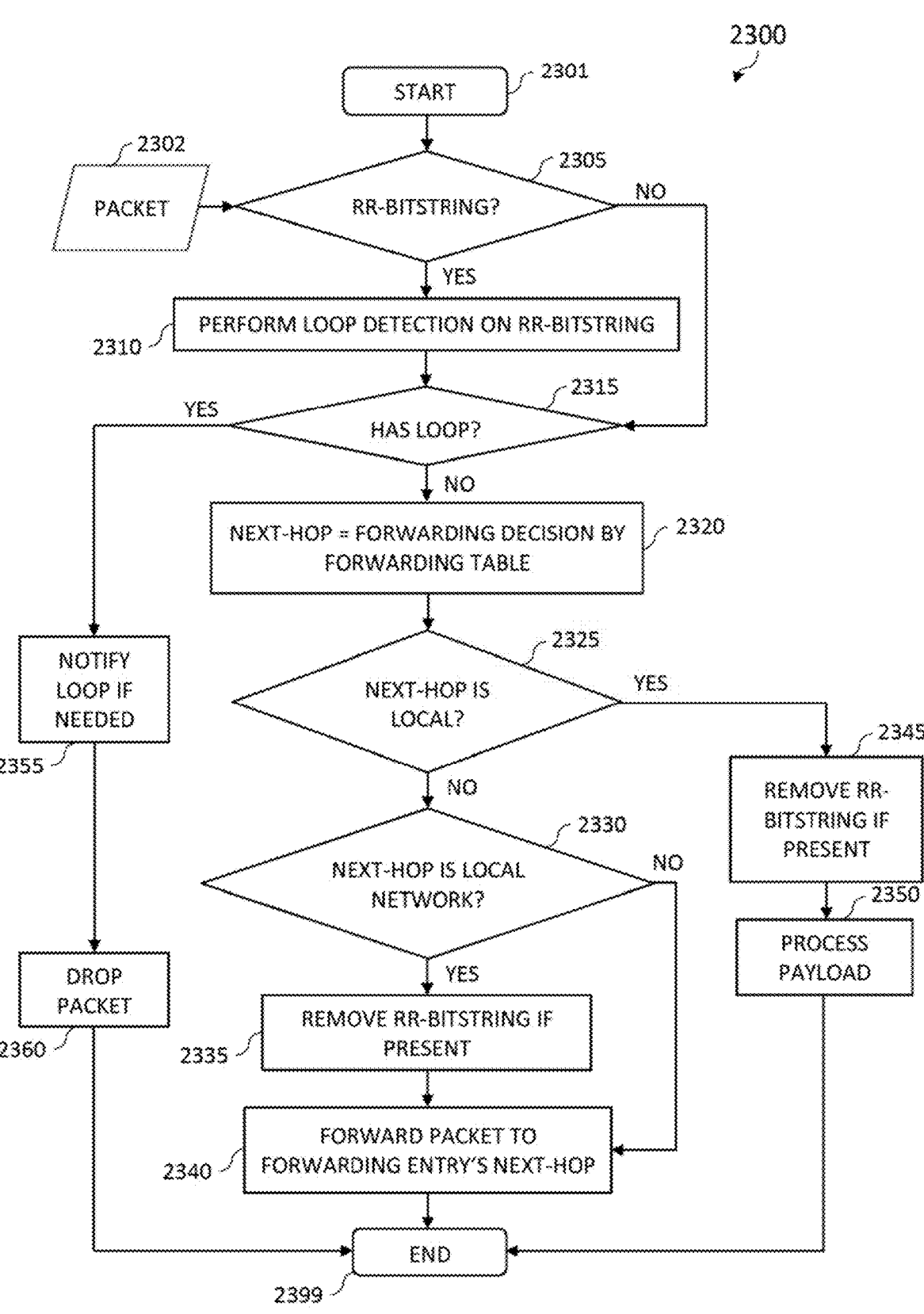
Figure 24:
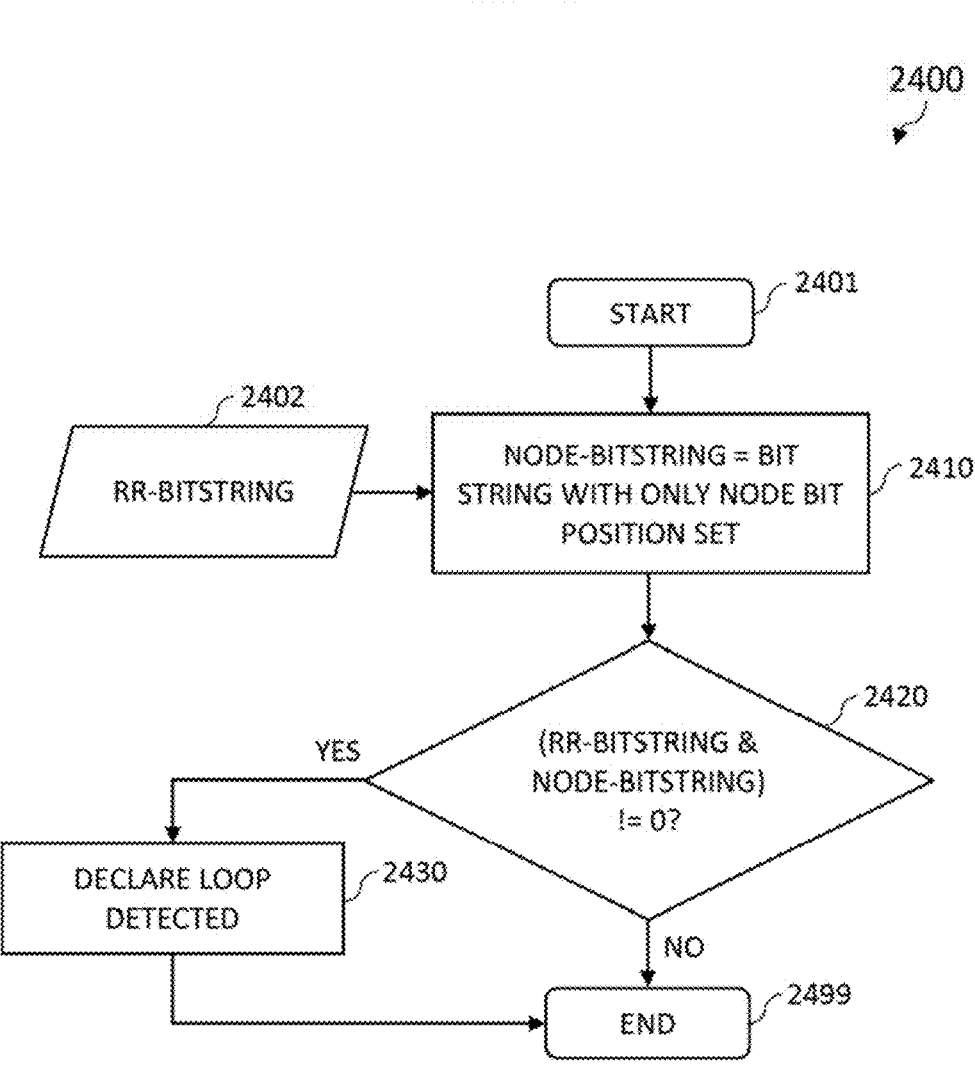
Figure 25:
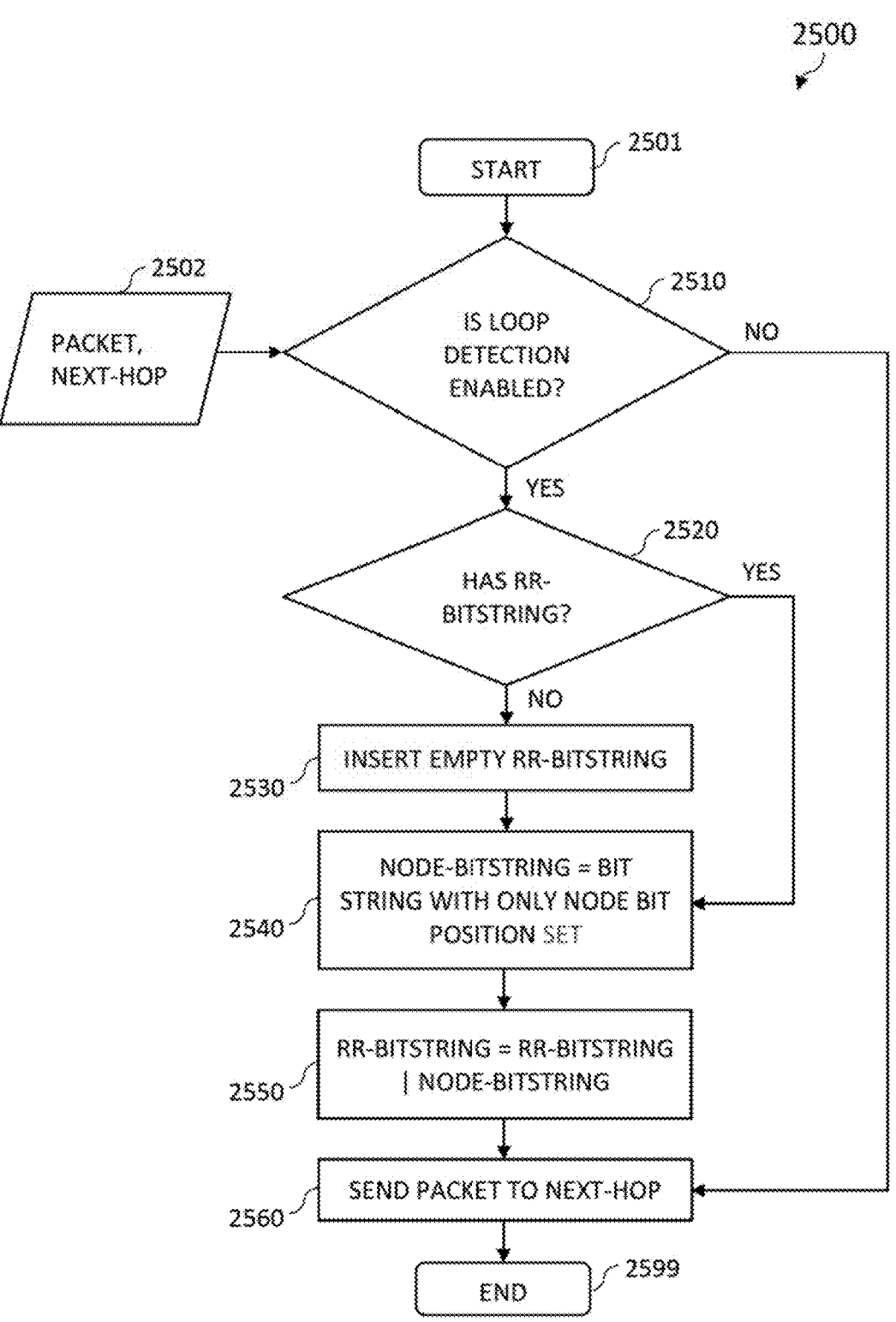
Figure 30:
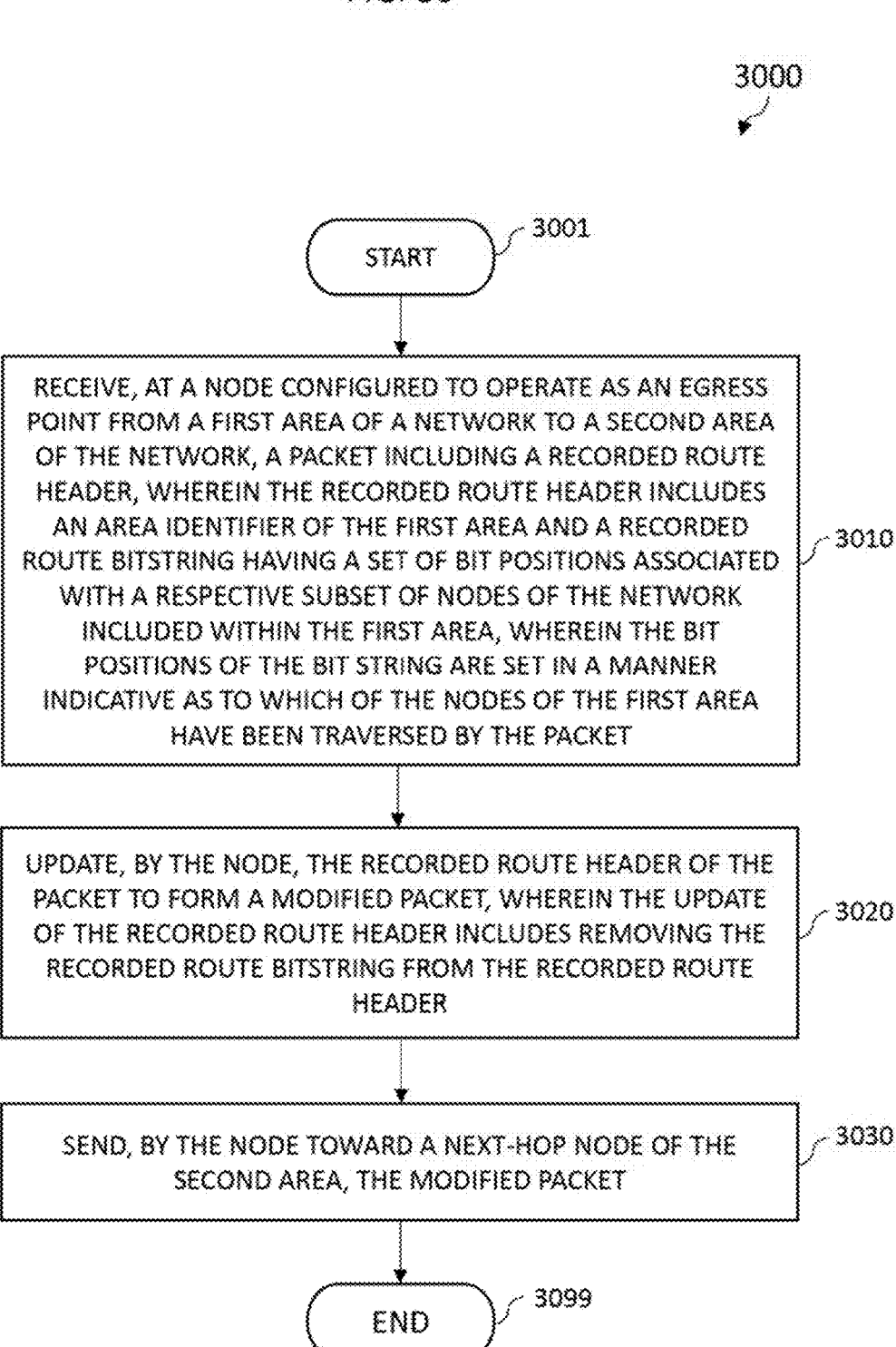
Figure 31:
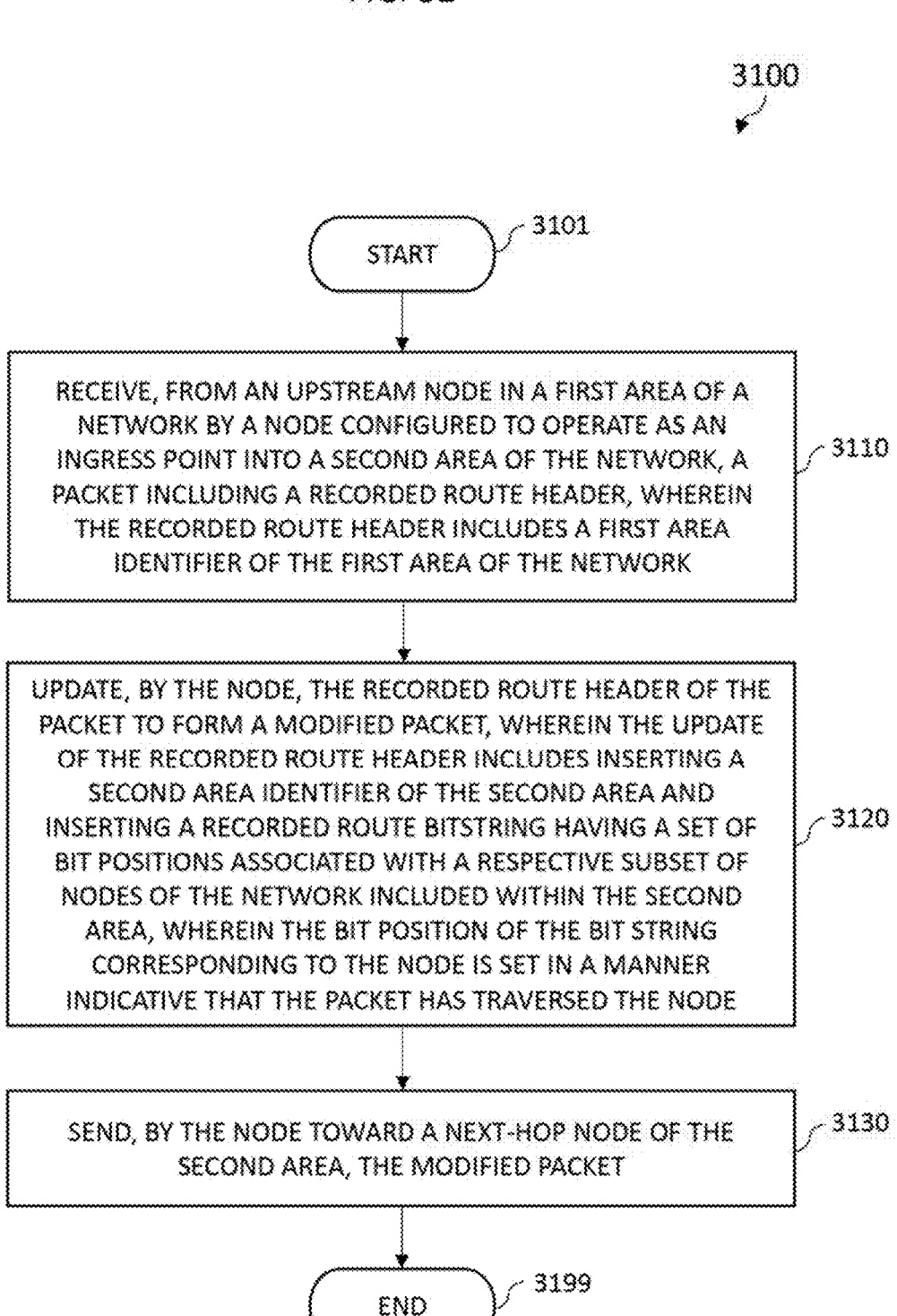
Figure 32:
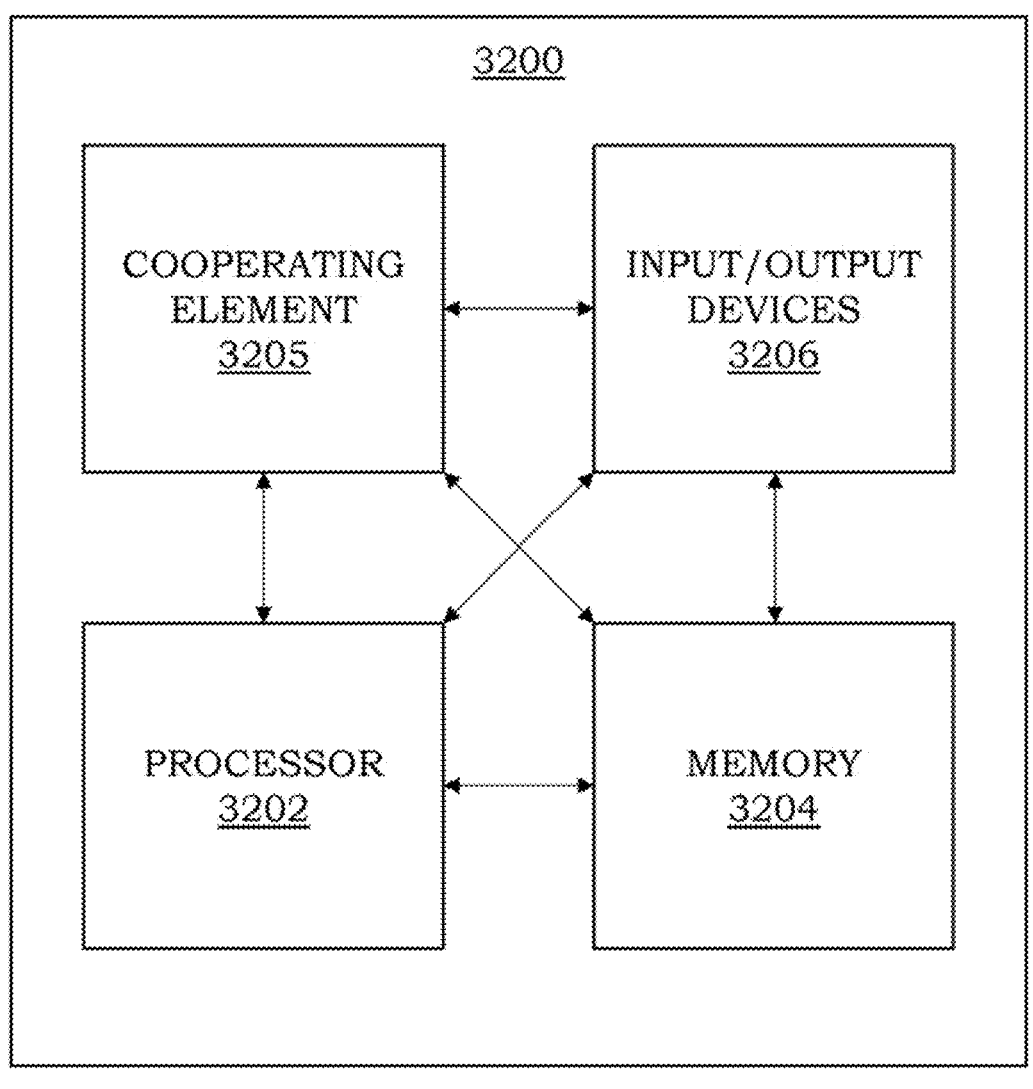

FIG. 10 depicts an example embodiment of a multi-area bitstring tuple configured for use in an MA-RR-bitstring;

Figures 11, 14:
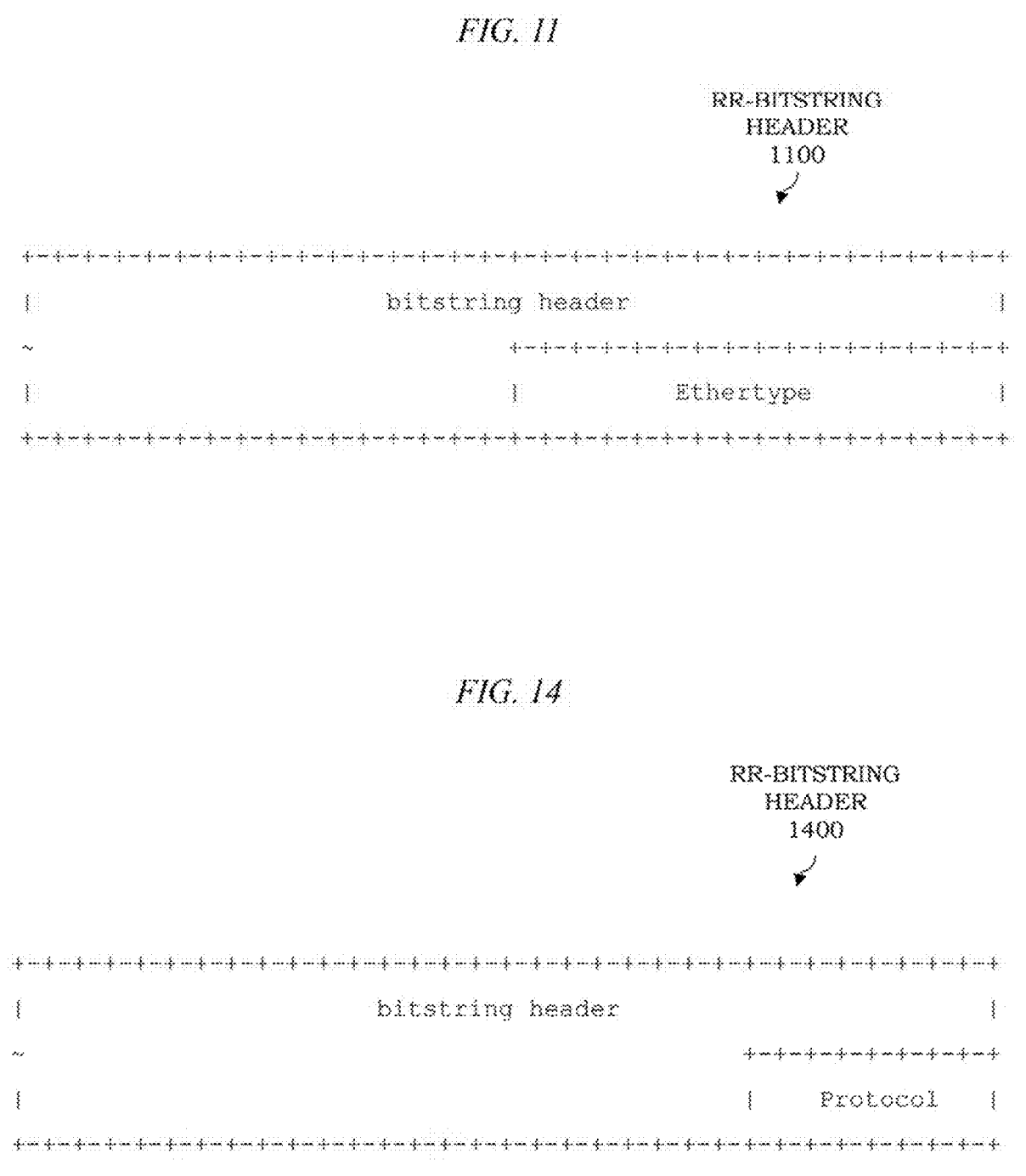

FIG. 11 depicts an example embodiment of an RR-bitstring header configured to be encoded above a native header of a packet where an outer header is Ethernet or below a native header of a packet where the native header of the packet is Ethernet;

FIG. 12 depicts an example embodiment of a packet illustrating an encoding of an RR-bitstring header within the packet such that the RR-bitstring header is encoded above a native header of the packet where an outer header is Ethernet;

FIG. 13 depicts an example embodiment of a packet illustrating an encoding of an RR-bitstring header within the packet such that the RR-bitstring header is encoded below a native header of the packet where the native header of the packet is Ethernet;

FIG. 14 depicts an example embodiment of an RR-bitstring header configured to be encoded below a native header of a packet where the native header of the packet is IP;

FIG. 15 depicts an example embodiment of a packet illustrating an encoding of an RR-bitstring header within the packet such that the RR-bitstring header is encoded below a native header of the packet where the native header of the packet is IPv4;

FIG. 16 depicts an example embodiment of a packet illustrating an encoding of an RR-bitstring header within the packet such that the RR-bitstring header is encoded below a native header of the packet where the native header of the packet is IPv6;

FIG. 17 depicts an example embodiment of an IPv4 Header including an IPv4 Option encoding an RR-bitstring header;

FIG. 18 depicts an example embodiment of an IPv4 Option, referred to as an RR-bitstring Option, defined to encode an RR-bitstring header;

FIG. 19 depicts an example embodiment of an IPv6 packet including an IPv6 Header having IPv6 Extension Headers including an IPv6 Extension Header encoding an RR-bitstring header;

Figure 20:
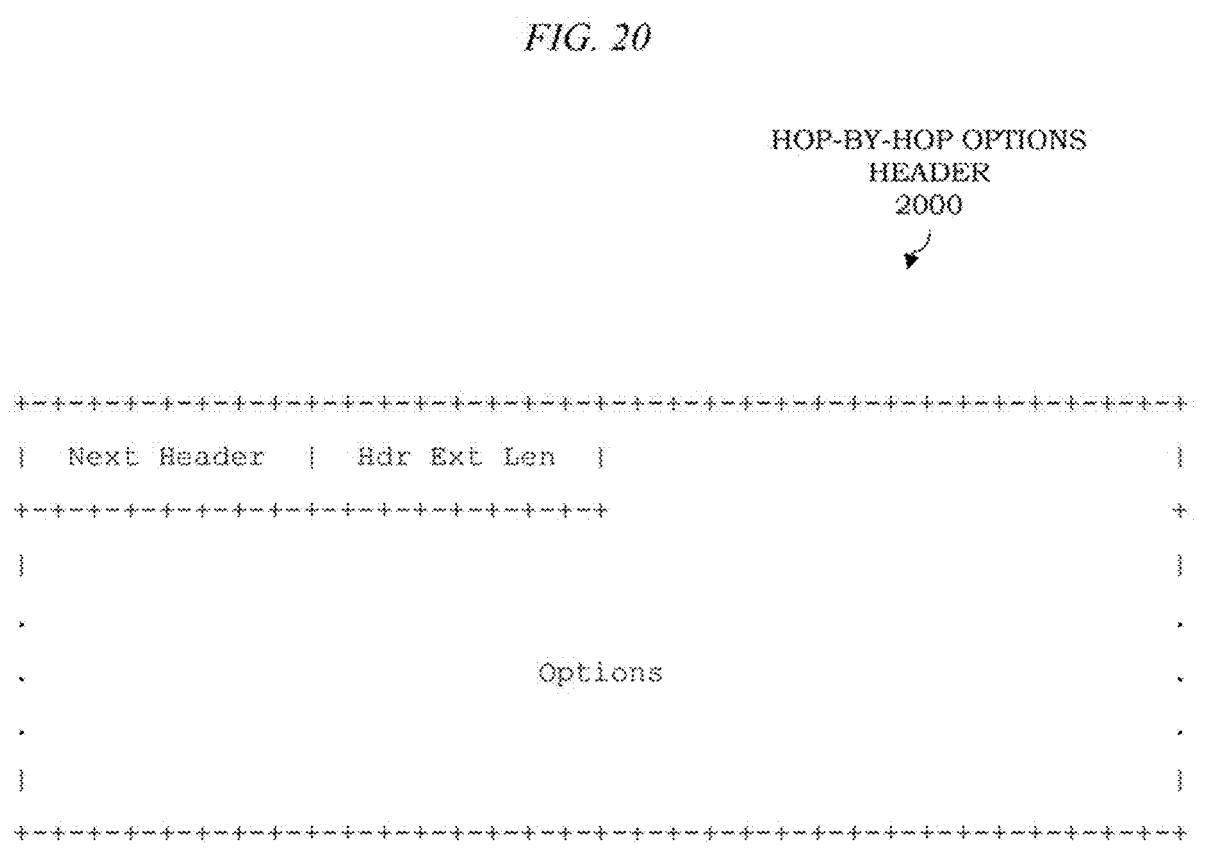

FIG. 20 depicts an example embodiment of an IP Hop-by-Hop Options Header configured to encode an RR-bitstring header;

FIG. 21 depicts an example embodiment of a Type-Length-Value (TLV) encoded Option for a Hop-by-Hop Options Header where the TLV encoded Option is configured to encode an RR-bitstring header;

FIG. 22 depicts an example embodiment of an RR-bitstring Option configured to encode an RR-bitstring header within a Hop-by-Hop Options header;

FIG. 23 depicts an example embodiment of a method for use by a node, configured to support loop detection, to process a packet;

FIG. 24 depicts an example embodiments of a method for use by a node for performing loop detection for a received packet;

FIG. 25 depicts an example embodiment of a method for use by a node for forwarding a packet to a next-hop;

FIG. 26 depicts an example embodiment of a method for supporting loop detection in a communication network;

FIG. 27 depicts an example embodiment of a method for supporting loop detection in a communication network;

FIG. 28 depicts an example embodiment of a method for supporting loop detection in a communication network;

FIG. 29 depicts an example embodiment of a method for supporting loop detection in a communication network composed of multiple areas;

FIG. 30 depicts an example embodiment of a method for supporting loop detection in a communication network composed of multiple areas;

FIG. 31 depicts an example embodiment of a method for supporting loop detection in a communication network composed of multiple areas; and FIG. 32 depicts an example embodiment of a computer suitable for use in performing various functions presented herein.

To facilitate understanding, identical reference numerals have been used herein, wherever possible, in order to designate identical or similar elements that are common among the various figures.

DETAILED DESCRIPTION

Various example embodiments for supporting loop detection in a communication network are presented. Various example embodiments for supporting loop detection in a communication network may be configured to support loop detection based on use of a recorded route bit string which may be inserted within packets for enabling detection of loops as the packets are communicated over the communication network. Various example embodiments for supporting loop detection in a communication network may be configured to support loop detection for a packet based on inclusion within the packet of a recorded route bit string having bit positions corresponding to nodes of the communication network where the bit positions may be set in a manner indicative of the nodes which have been traversed by the packet. Various example embodiments for supporting loop detection in a communication network may be configured to support universal loop detection for providing loop detection within various types of communication networks, for communications based on various types of communication protocols, or the like, as well as various combinations thereof. It will be appreciated that these and various other example embodiments and advantages or potential advantages of example embodiments for supporting loop detection in a communication network may be further understood by way of reference to the various figures, which are discussed further below.

Figure 1:
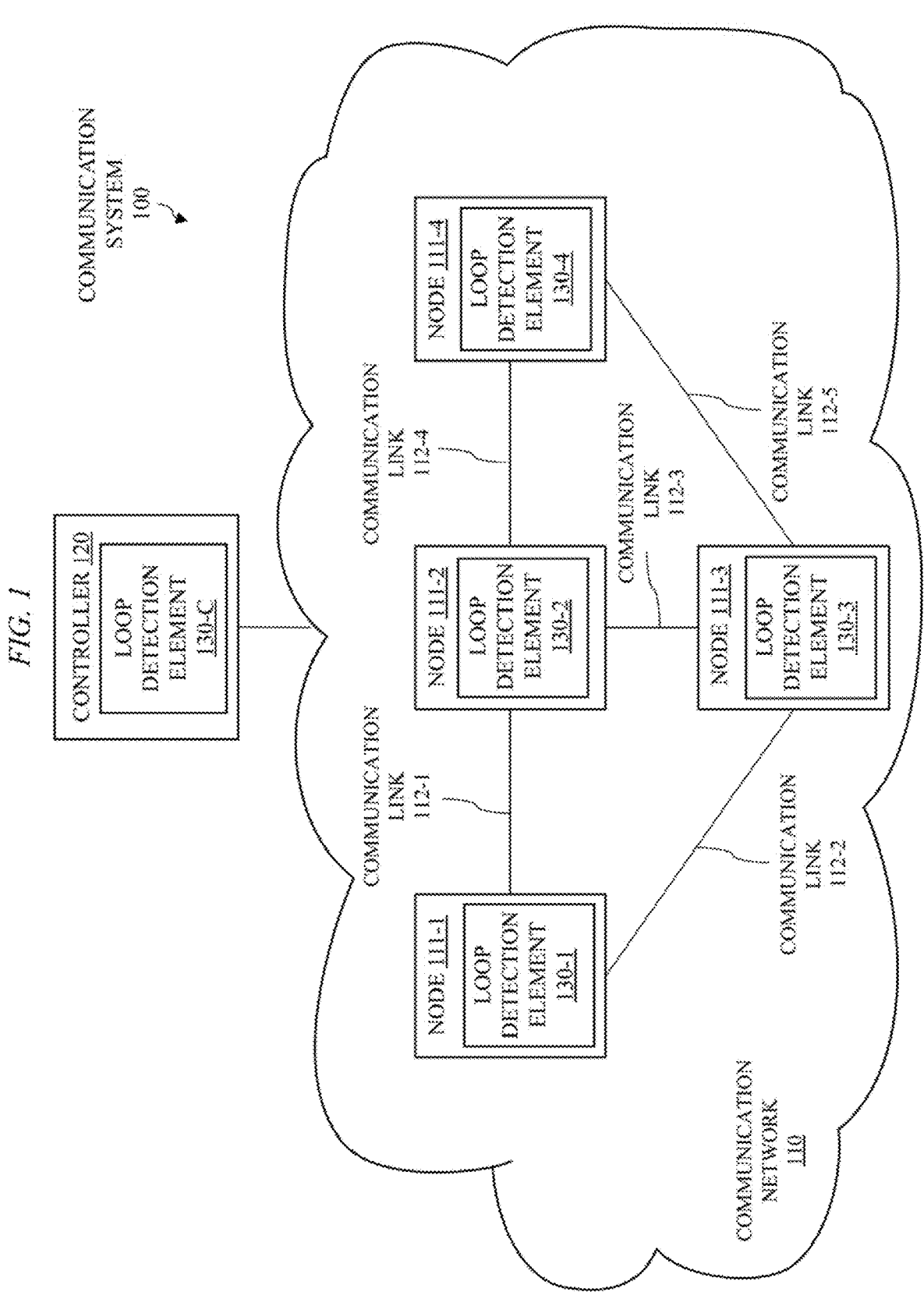
FIG. 1 depicts an example embodiment of a communication network configured to support example embodiments of loop detection presented herein.

FIG. 1 depicts an example embodiment of a communication network configured to support example embodiments of loop detection presented herein.

The communication system 100 includes a communication network 110 and a controller 120. The communication network 110 may be configured to support communication using various communication methodologies. The controller 120 may be configured to provide various network control functions for the communication network 110. It will be appreciated that the communication system 100, although primarily presented as having a specific implementation, may be implemented in various other ways.

The communication network 110 includes a set of nodes 111-1 to 111-4 (collectively, nodes 111) and a set of communication links 112-1 to 112-5 (collectively, communication links 112). The nodes 111-1 and 111-2 are connected by communication link 112-1, the nodes 111-1 and 111-3 are connected by communication link 112-2, the nodes 111-2 and 111-3 are connected by communication link 112-3, the nodes 111-2 and 111-4 are connected by communication link 112-4, and the nodes 111-3 and 111-4 are connected by communication link 112-5. It will be appreciated that the communication network 110, although primarily presented with respect to a specific topology (i.e., specific numbers and arrangements of nodes 111 and communication links 112), may be implemented in various other topologies (e.g., using other numbers and/or other arrangements of nodes 111 and/or communication links 112).

The communication network 110 may be configured to support communication using various communication capabilities (e.g., various communication methodologies, various communication protocols, or the like, as well as various combinations thereof). For example, the communication network 110 may be a packet switching network configured to support communication of packets based on various packet switching technologies. For example, the communication network may be configured to support communications using Internet Protocol (IP), Multiprotocol Label Switching (MPLS), Ethernet or the like, as well as various combinations thereof. It will be appreciated that the communication network 110 may be configured to support communications based on various other communication capabilities (e.g., various other communications protocols, various other combinations of communication protocols, or the like, as well as various combinations thereof).

The controller 120 may be configured to provide various control functions for the communication network 110, including for the nodes 111 and the communication links 112 which connect the nodes 111. For example, the controller 120 may be configured to support network management functions, network provisioning functions, service provisioning functions, network monitoring functions, network fault detection functions, network fault mitigation functions, or the like, as well as various combinations thereof. It will be appreciated that the set of control functions provided by the controller 120 for the communication network 110 may vary depending on various aspects of the communication network 110 (e.g., the type of packet switching technology used, the set of communication protocols used, or the like, as well as various combinations thereof).

The communication system 100 is configured to support loop detection within the communication network 110. The communication network 110 may be configured to support loop detection. The nodes 111-1-111-4 include loop detection elements 130-1-130-4 (collectively, loop detection elements 130-N), respectively, configured to support various example embodiments of loop detection as presented herein. The controller 120 includes a loop detection element 130-C configured to support various example embodiments of loop detection as presented herein. It will be appreciated that the communication system 100 may be configured in various other ways to support various example embodiments of loop detection as presented herein.

Various example embodiments presented herein may be configured to provide a generic and efficient mechanism for detection of loops in a packet switching network.

Loops can occur in a network for several reasons. For example, a transient loop can occur during convergence across the network due to a topology change, during fast reroute (FRR) operations, or the like. For example, a permanent loop can occur due to faulty behavior of a node that can redirect the data packets along a wrong path in such a way that the packets re-enter the already traversed path. It will be appreciated that loops may be formed in response to various other conditions which may arise within packet switching networks.

In general, loops in a packet switching network can be classified into two categories: (1) micro-loops in which a packet loops back and forth between two directly connected

US 12,580,999 B2

Figure 2:
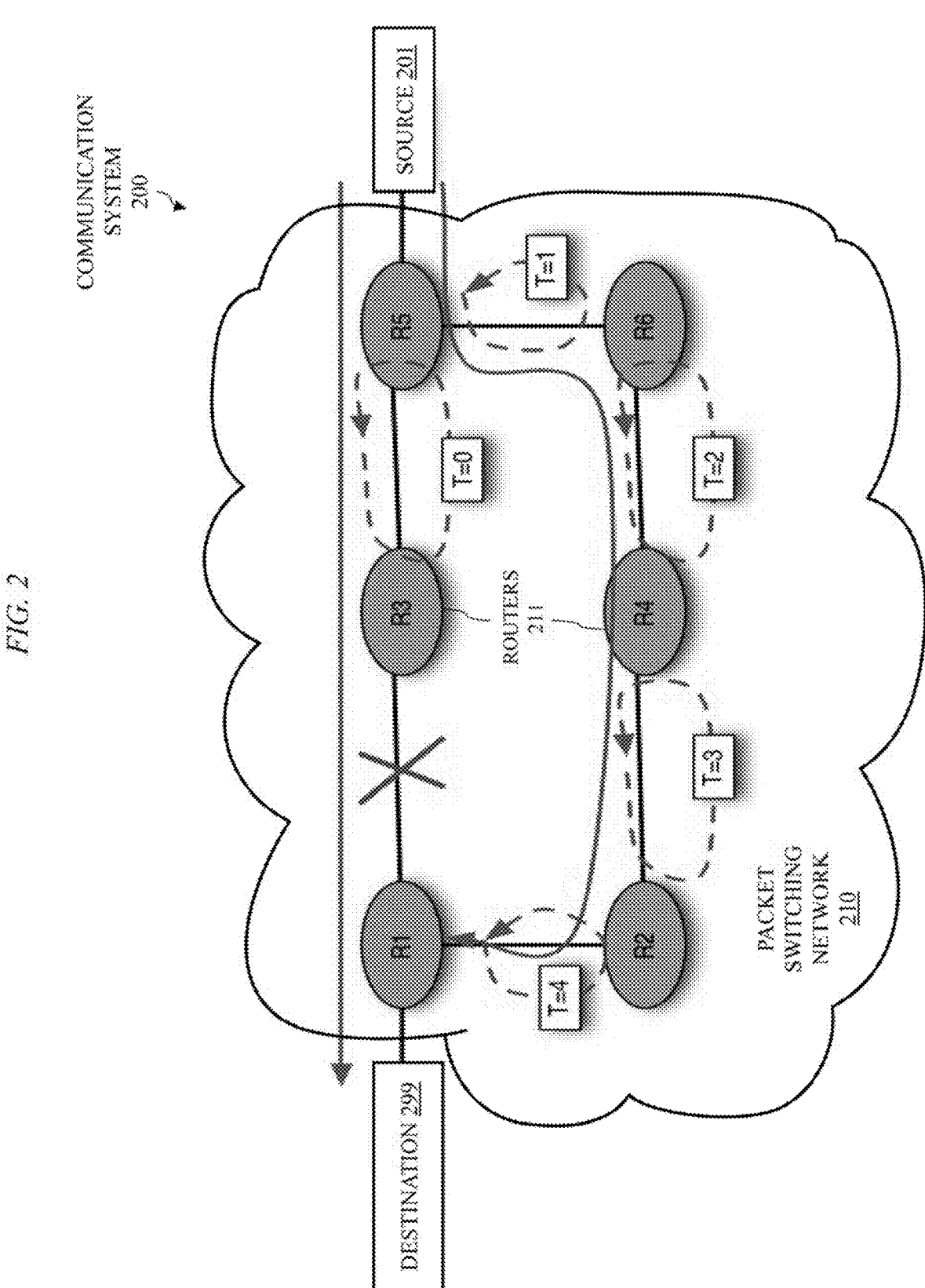
FIG. 2 depicts an example of micro-loops in a network during network convergence which may be detected based on example embodiments of loop detection presented herein.
Figure 3:
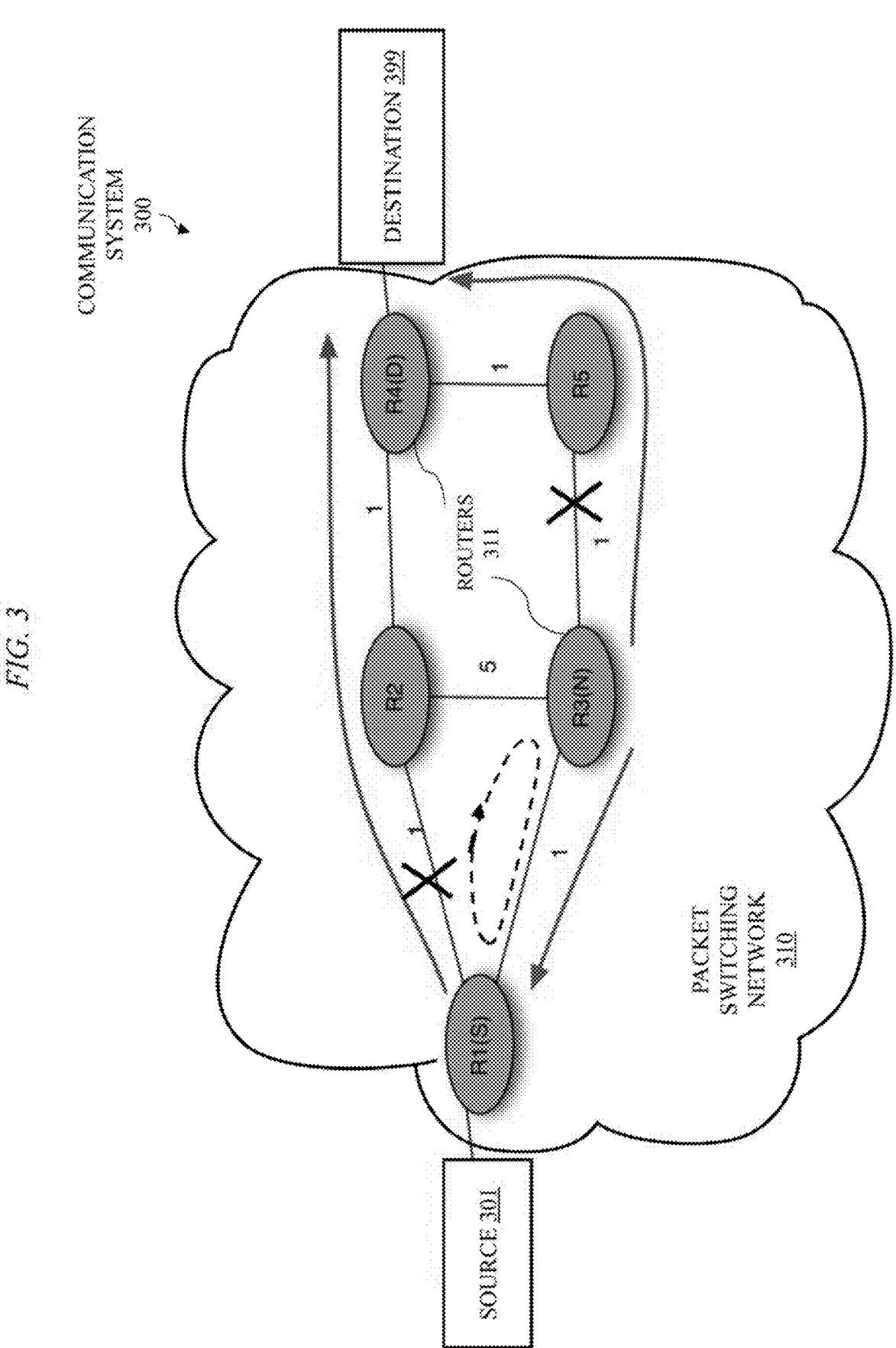
FIG. 3 depicts an example of a micro-loop in a network during a fast-reroute which may be detected based on example embodiments of loop detection presented herein.
Figure 4:
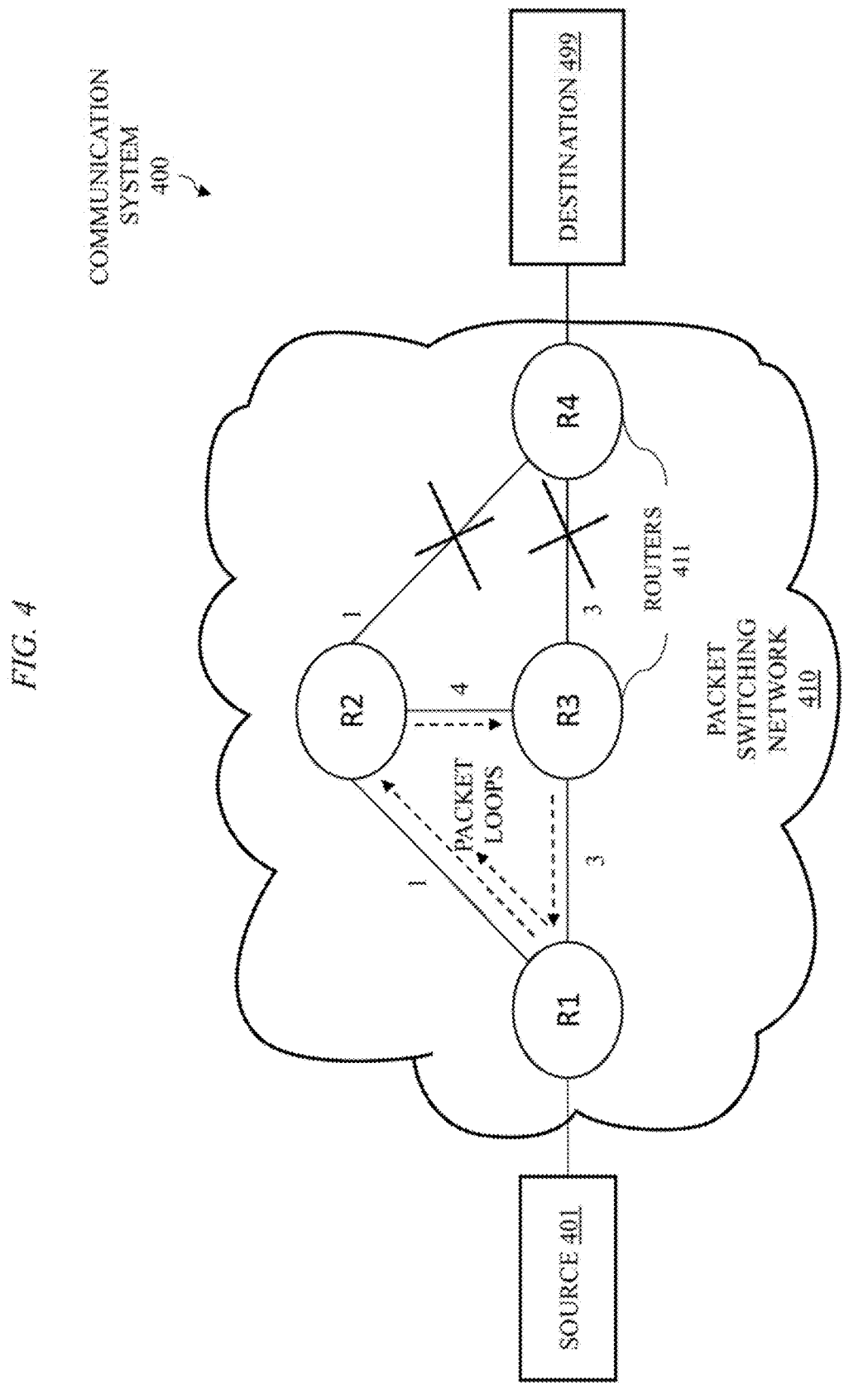
FIG. 4 depicts an example of a macro-loop in a network during a fast-reroute which may be detected based on example embodiments of loop detection presented herein.

13 nodes and (2) macro-loops in which a packet loops between two indirectly connected nodes. Micro-loops and macro-loops may be further understood by considering the examples of FIGS. 2-5, which depict examples of a micro-loops which formed as a result of network convergence (e.g., as illustrated in FIG. 2), a micro-loop formed as a result of a FRR operation (e.g., as illustrated in FIG. 3), and a macro-loop formed as a result of a FRR operation (e.g., as illustrated in FIG. 4). As discussed further below, these types of loops as well as various other types of loops which may be formed under various other conditions may be detected based on various example embodiments of loop detection as presented herein.

FIG. 2 depicts an example of micro-loops in a network during network convergence which may be detected based on example embodiments of loop detection presented herein. The micro-loops of FIG. 2 may be further understood by first considering various aspects of network operation which may result in the formation of the micro-loops.

In general, paths computed by link state protocols (e.g. Open Shortest Path First (OSPF), Intermediate-System-to-Intermediate-System (IS-IS), OSPF version 3 (OSPFv3) or the like) are susceptible to transient loops for a brief period due to independent decisions made by the protocol in each node in the network. Link state protocols flood the status of locally connected networks and links of every node across the network. From the link state updates, each node in the network builds an identical copy of the topology of the network. Then, based on the topology, each node independently computes paths to every other node and their advertised networks by using Dijkstra's Shortest Path First (SPF) algorithm. After the SPF computation, a node updates its forwarding table used to make forwarding decisions for the packets.

In FIG. 2, a communication system 200 includes a packet switching network 210 configured to support communication from a source 201 to a destination 299. The packet switching network 210 includes six routers 211 which, for ease of reference, are denoted using the notation Rx (illustratively, routers R1-R6).

In FIG. 2, packets from the source 201 to the destination 299 are traversing the path R5→R3→R1. When the link between R3-R1 fails, then R3 will send a link state update packet (R1 will do so too), telling each of the routers that the R3-R1 link has failed. Then, R3 will compute the next best path which is towards R5 and update its forwarding table accordingly. The new best path will be R5→R6→R4→R2→R1, but it is likely that R5 will update its forwarding table after R3 updates its forwarding table. For example, assume that at interval T=0, R5 will send the packets to R3 which will result in a micro-loop R5→R3→R5→R3 until R5 updates its forwarding table to point toward R6. However, it is possible that R6 updates its forwarding table after R5, which means that, at interval T=1, a forwarding loop will appear between R5→R6→R5→R6. The forwarding loop will work its way toward every hop until R1. The durations of micro-loops are proportional to the time taken to propagate the topology change through the network and time taken by each of the routers to compute SPF and update their forwarding tables. It will be appreciated that one potential option to eliminate micro-loops such as the micro-loops presented in FIG. 2 is to speed up the convergence process, but this is unlikely due to the fundamental limits of the speed of light and memory update latency. Accordingly, in at least some embodiments, various example embodiments of loop detection may be employed for detecting micro-loops such as the micro-loops presented in FIG. 2.

FIG. 3 depicts an example of a micro-loop in a network during a fast-reroute which may be detected based on example embodiments of loop detection presented herein. The micro-loop of FIG. 3 may be further understood by first considering various aspects of network operation which may result in the formation of the micro-loop.

As indicated above, FRR provides another example scenario of transient loops. FRR is based upon the Loop Free Alternate (LFA) paths computed by link state protocols. Normally, link state protocols only calculate the shortest path for a destination through the SPF algorithm. So, the idea of LFA is that an alternate path to the destination can be computed during SPF and be used as a backup path as long as the backup path does not cause a forwarding loop, i.e., the shortest path to the destination from a router along the backup path but not including any other node along the backup path.

In order to avoid forwarding loops, a node needs to run some additional calculations to verify that a candidate backup path does not create a forwarding loop. A path that does not cause a forwarding loop is called an LFA path. The node calculates the LFA paths in advance and installs them against the respective primary paths (shortest paths) of a forwarding entry in the forwarding table, so that the LFA paths are available at the nodes when a FRR operation needs to be performed.

RFC 5286, Basic Specification for IP Fast Reroute: Loop-Free Alternates, RFC 5286, offers a method for calculating LFAs in IP networks based on various route inequalities. RFC 5286 is not limited to IP networks but rather, the general idea is applicable to any packet switched networks such as MPLS, Ethernet, or the like.

In FIG. 3, a communication system 300 includes a packet switching network 310 configured to support communication from a source 301 to a destination 399. The packet switching network 310 includes five routers 311 which, for ease of reference, are denoted using the notation Rx (illustratively, routers R1-R5). The source 301 is connected to router R1 and the destination 399 is connected to router R4, such that R1 is the calculating node which is the ingress node for packets into the packet switching network 310 and R4 is the destination under consideration. The metric/costs of the links are shown alongside the links.

In FIG. 3, R1 computes the shortest path to R4 as R1→R2→R4 (of cost 2), where R2 is the primary next-hop. The alternate path R1→R3→R5→R4 (of cost 3) is loop-free, because the shortest path from R3 to R4, i.e. R3→R5→R4, is not through local node R1. Traffic sent by R1 to backup next-hop R3 is not sent back to R1. So, R1 can use R3 as a backup next hop for the path to R4. As a result, R1 programs the forwarding entry to R4 into its forwarding table with R2 as the primary next-hop and R3 as the backup next-hop.

In FIG. 3, when link R1→R2 fails, R1 fast-reroutes the packets via the backup next-hop R3. R3 sends those packets along the primary path R3→R5→R4. However, note that R3 may also compute an LFA path to R4 to protect against failure of its primary next-hop R5. As evident from the topology, the alternate path R3→R1→R2→R4 (cost 3) is loop-free, because the shortest path of R1, i.e., R1→R2→R4 (cost 2), is not via R3. As a result, R3 programs the forwarding entry to R4 into forwarding table with R5 as the primary next-hop and R1 as the backup next-hop.

In FIG. 3, now assume that there is a situation when both the links R1→R2 and R3→R5 fail simultaneously. Then, R1 fast-reroutes the packets to R4 via backup next-hop R3. When the packets reach R3, R3 finds that primary next hop to R4 failed. So, R3 fast-reroutes the packets via its backup next-hop R1. This causes a micro-loop R1→R3→R1→R3 as shown in FIG. 3, until the network re-converges and the route is updated into forwarding table across the network, i.e., the primary path becomes R1→R3→R2→R4.

FIG. 4 depicts an example of a macro-loop in a network during a fast-reroute which may be detected based on example embodiments of loop detection presented herein. The macro-loop of FIG. 4 may be further understood by first considering various aspects of network operation which may result in the formation of the macro-loop.

In FIG. 4, a communication system 400 includes a packet switching network 410 configured to support communication from a source 401 to a destination 499. The packet switching network 410 includes four routers 411 which, for ease of reference, are denoted using the notation Rx (illustratively, routers R1-R4). The source 401 is connected to router R1 and the destination 499 is connected to router R4, such that R1 is the calculating node which is the ingress node for packets into the packet switching network 410 and R4 is the egress node of packets under consideration. The metric/costs of the links are shown alongside the links.

In FIG. 4, R1 computed the shortest path as R1→R2→R4 (cost 2) and computed the LFA path as R1→R3→R4(cost 5). R2 computed the shortest path as R2→R4 (cost 1) and computed the LFA path as R2→R3→R4 (cost 7). Although R2 has a better alternate path R2→R1→R3→R4 of cost 6, that path is not LFA because R2 is included in primary path of R1 to R4. R3 computed the shortest path as R3→R4 (cost 3) and computed the LFA path as R3→R1→R2→R4 (cost 4).

In FIG. 4, assume that link R2→R4 and link R3→R4 failed simultaneously. When packets from R1 arrive at R2 destined to R4, R2 finds that link R2→R4 failed, so R2 fast-reroutes the packets via the backup next-hop R3. When the packets arrive at R3, R3 finds that link R3→R4 failed, so it fast-reroutes the packets via the backup next-hop R1. So, the packets are looping along R1→R2→R3→R1→R2→R3, which is a macro-loop as it traverses more than two nodes.

It is noted that the macro-loop of FIG. 4 also can happen in non-failure scenarios. For example, assume that both R2 and R3 are misbehaving nodes such that both computed shortest paths incorrectly or updated forwarding tables incorrectly. When packets from R1 arrive at R2 destined to R4, instead of forwarding on link R2→R4, R2 wrongly sent the packets to R3. When the packets arrive at R3, instead of forwarding on link R3→R4, R3 wrongly sent the packets via next-hop R1. So, the packets are looping along R1→R2→R3→R1→R2→R3. However, unlike the transient loops during convergence, the loop here could be a permanent one.

It is further noted that, whenever a loop, including a transient loop that may resolve, exists, the loop causes some collateral damage. The IPv4 and MPLS Headers include a one-octet Time to Live (TTL) field and the IPv6 Header includes a one-octet Hop Limit field, each of which may be used for loop detection and mitigation while forwarding respective packet types. The source node of the packet sets a TTL value such that it is sufficient enough for the packet to reach its destination. Typically, a source node sets the TTL value to the maximum, i.e., 255. Every forwarding hop decrements the TTL field value by one. If the TTL value becomes zero at a forwarding node, then that node drops the packet. A looping packet may amplify traffic and consumes bandwidth until the TTL of the IP packet (i.e., the TTL field in the IPv4 Header of the IPv4 Packet or the Hop Limit field in the IPv6 Header of the IPv6 Packet) expires or until the packet escapes the loop as a result of forwarding table convergence. This can transiently cause congestion even on a well-provisioned link by increasing the traffic. This congestion reduces the bandwidth for other traffic (which would not have been affected otherwise) and causes delay and congestive packet loss on the links. The duration of the delay is equal to the duration of the loop. If the loop is a permanent one due to misbehavior of the nodes, then packets will keep looping until the TTL expires. For example, assume that, in FIG. 4, R1 sends the packets with TTL=255 (i.e., the maximum value, which is usually the default value while originating IP packets). So, the packets will make 85 rounds on the macro-loop R1→R2→R3→R1→R2→R3 until the TTL expires, which results in dropping of packets. The bandwidth consumption around the loop gets amplified by 85 times. To generalize, if a loop consists of N routers and TTL before the start of the loop is T, then a packet will make at least T/N loops before it gets dropped. Additionally, in the Ethernet Header there is no field that can be used to detect forwarding loops, so packets will keep looping until forwarding table convergence. In case of permanent loops in an Ethernet network due to misbehavior of one or more nodes, the packets will keep looping forever. Accordingly, the best defense against loops is detection of the loops when the loops form so that the packet may dropped immediately before looping within the network (i.e., not allowing the packets to continue after the first round in the loop).

Various example embodiments for loop detection may be configured to support a universal loop detection capability, providing a generic and protocol-independent capability for detection of loops in any packet switching network. For example, various example embodiments for supporting loop detection in a communication network may be configured to support universal loop detection for providing loop detection within various types of communication networks, for communications based on various types of communication protocols, or the like, as well as various combinations thereof. For example, various example embodiments for supporting loop detection in a communication network may be configured to support loop detection in a manner that enables detection of the loop when the loop forms so that packets do not circulate within the loop multiple times (thereby consuming network resources) before being detected. For example, various example embodiments for supporting loop detection in a communication network may be configured to support loop detection for various types of loops (e.g., micro-loops and macro-loops) which may form under various types of conditions (e.g., network convergence, FRR operations, misbehaving routers, or the like).

Various example embodiments of loop detection may be configured to support detection of a looping packet based on inclusion of a Recorded Route bit string (RR-bitstring) within the packet. The RR-bitstring includes a set of bit positions corresponding to nodes of the network, respectively, and the bit positions of the RR-bitstring are set in a manner indicative of the nodes that have been traversed by the packet (e.g., a bit position for a node that is set to "1" means that the packet has traversed the node and a bit position for a node that is set to "0" means that the packet has not traversed the node, or vice versa). When a node receives a packet, the node checks the RR-bitstring of the packet to determine whether its own bit position has been set (meaning that the packet previously traversed the node) and determines handling of the packet based on whether its own bit position has been set (e.g., when its own bit position is set in the received RR-bitstring a loop is detected and the packet may be dropped, whereas when its own bit position is not set in the received RR-bitstring a loop is not detected and the packet may be forwarded). It will be appreciated that these and various other example embodiments of the loop detection capability presented herein may be further understood by considering the packet switched network of FIG. 5.

Figure 5:
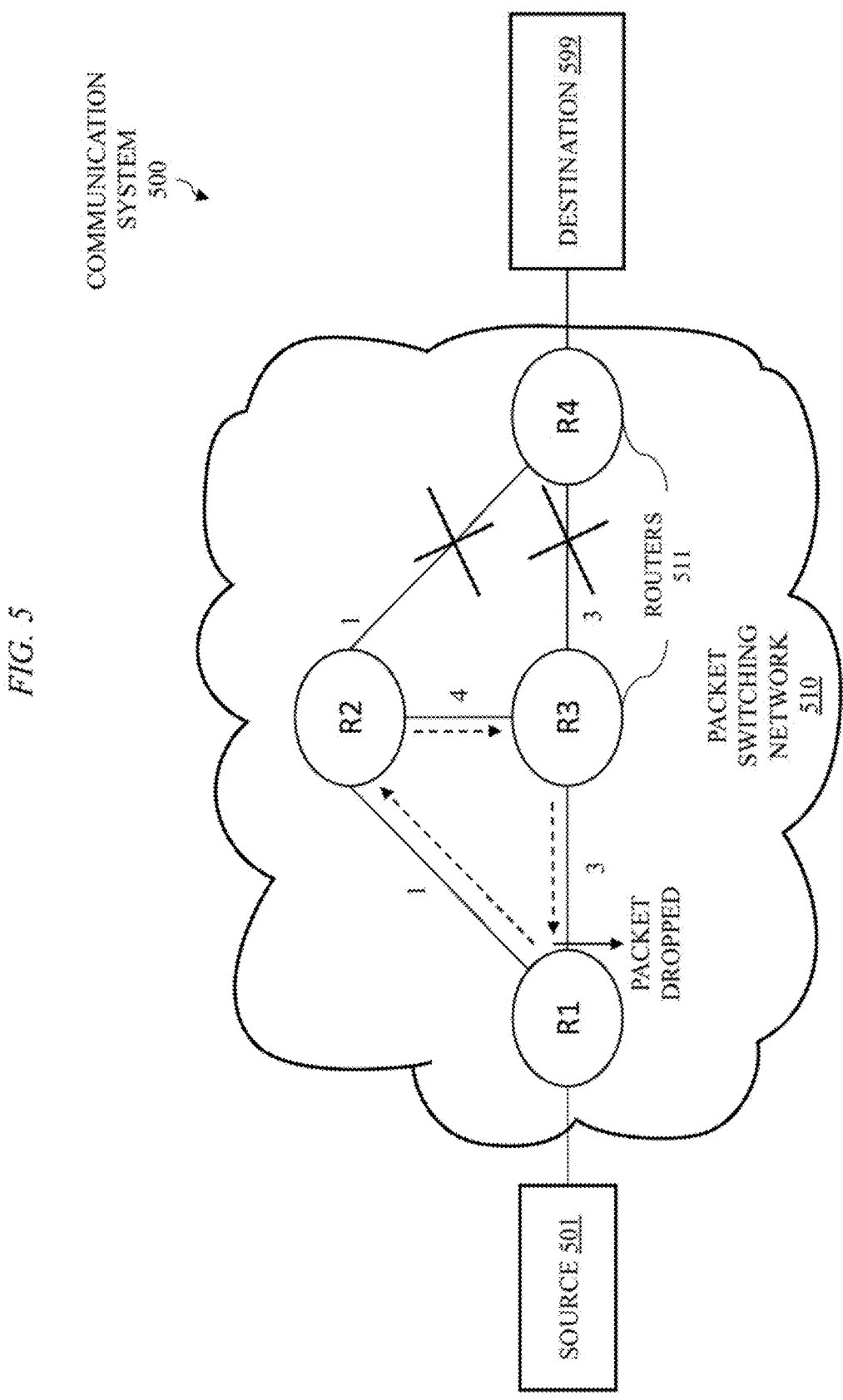
FIG. 5 depicts the macro-loop of FIG. 4 for illustrating detection of the macro-loop based on example embodiments of loop detection presented herein.

FIG. 5 depicts the macro-loop of FIG. 4 for illustrating detection of the macro-loop based on example embodiments of loop detection presented herein. The detection of the macro-loop of FIG. 5 may be further understood by first considering various aspects of network operation which may result in the formation of the macro-loop.

In FIG. 5, the communication system 500 is similar to the communication system 400 of FIG. 4, including a packet switching network 510 configured to support communication from a source 501 to a destination 599. In FIG. 5, the primary paths, LFA paths, and macro-loop are the same as in FIG. 4.

In FIG. 5, the bit position configured for router Rx is denoted as x. For example, the bit position for R1 is 1, the bit position for R2 is 2, and so forth. For example, the RR-bitstring for the path R1→R2→R4 is 01011, where it will be understood that the RR-bitstring of the packet when sent by R1 is 00001, the RR-bitstring of the packet when sent by R2 is 00011, and the RR-bitstring of the packet when sent by R4 is 01011.

In FIG. 5, in the case when the macro-loop forms as R1-R2-R3-R1 because link R2→R4 and link R3→R4 failed simultaneously, the loop will be detected based on the RR-bitstring as follows. When R1 sends the packet along primary path R1-R2-R4, it sets its bit position in the RR-bitstring (bitstring=00001) and forwards the packet to R2. When the packet from R1 arrives at R2 destined to R4, R2 finds that link R2→R4 has failed, so R2 fast-reroutes the packet via the backup next-hop R3. When R2 sends the packet along the backup path to R3, it sets its bit position in the RR-bitstring (bitstring=00011) and forwards the packet to R3. When the packet from R2 arrives at R3, R3 finds that link R3→R4 has failed, so R3 fast-reroutes the packets via the backup next-hop R1. When R3 sends the packet along the backup path to R1, it sets its bit position in the RR-bitstring (bitstring=00111) and forwards the packet to R1. When R1 receives the packet from R3, it checks its own bit position in the RR-bitstring and, based on determining that its bit position is already set in the RR-bitstring, R1 identifies the loop and drops the packet.

The RR-bitstring can be encoded within packets in various ways. For example, the RR-bitstring can be encoded as an independent layer or header that is independent from the native header of the packet for which loop detection is being performed (e.g., example embodiments of which are presented with respect to FIGS. 6A and 6B). For example, the RR-bitstring can be encoded as an extension to the native header of the packet (e.g., IP such as IPv4 or IPv6, MPLS, Ethernet, or the like) for which loop detection is being performed (e.g., example embodiments of which are presented with respect to FIG. 6B).

Figures 6A, 6B, 7:
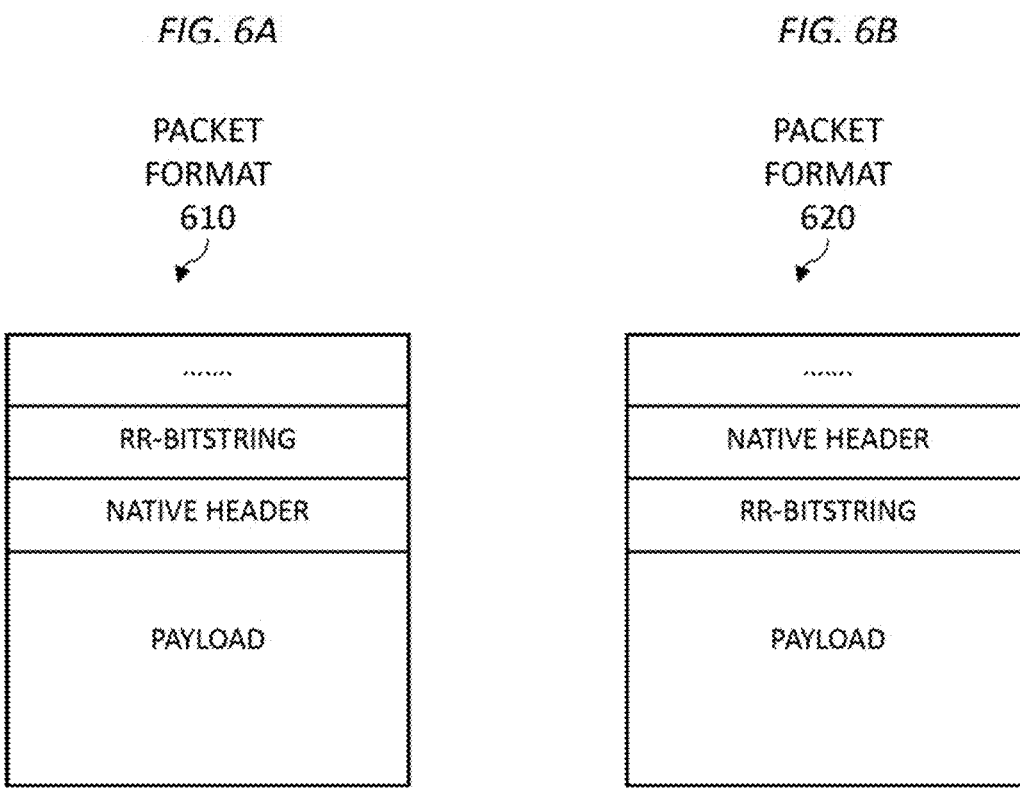
FIGS. 6A and 6B depict example embodiments for encoding of a recorded route bit string (RR-bitstring) within a packet for supporting loop detection for the packet.
FIG. 7 depicts an example embodiment of a multi-area recorded route bitstring (MA-RR-bitstring) format configured to support loop detection in multi-area packet switching networks.

FIGS. 6A and 6B depict example embodiments for encoding of an RR-bitstring within a packet for supporting loop detection for the packet. It will be appreciated that the RR-bitstring may be inserted within a packet in various ways for supporting loop detection for the packet.

FIG. 6A depicts an example embodiment of an encoding of an RR-bitstring as an independent header where the RR-bitstring is positioned above the native header. Herein, "above" used in relation to a location of a header or other information within a packet means nearer to the outermost header of the packet and farther from the payload. As illustrated in FIG. 6A, the packet format 610 includes a payload, a native header above the payload and adjacent to the payload, an RR-bitstring above the native header and adjacent to the native header (such that the native header is disposed between the payload and the RR-bitstring), and may include one or more other headers above the RR-bitstring. Here, the RR-bitstring may be independent of the native header.

FIG. 6B depicts an example embodiment of an encoding of an RR-bitstring either as extension to the native header or as independent header where the RR-bitstring is positioned below the native header. Herein "below" used in relation to a location of a header or other information within a packet means nearer to the payload of the packet and farther from the outermost header of the packet. As illustrated in FIG. 6B, the packet format 620 includes a payload, an RR-bitstring above the payload and adjacent to the payload, a native header above the RR-bitstring and adjacent to the RR-bitstring (such that the RR-bitstring is disposed between the payload and the native), and may include one or more other headers above the native header. Here, the RR-bitstring may be independent of the native header or an extension of the native header.

In at least some example embodiments, loop detection may be performed as follows. A packet switched network includes nodes that are configured to support communication of packets. In the packet switched network, each node maintains a Node-bitstring where the Node-bitstring of the node is a bitstring that includes bit positions for each of the nodes in the network, but where only the bit position of the node is set. In the packet switched network, for a packet to be routed over a path in the packet switched network, a node along the path that intends to enable loop detection on the packet includes an RR-bitstring in the packet. The router encodes its own bit position in the RR-bitstring, i.e., it is the only bit position set in RR-bitstring at this point. When a node receives a packet with RR-bitstring, it executes the following actions:

1. The node performs a bitwise-AND operation on the RR-bitstring with the Node-bitstring to detect the presence of its bit position in the RR-bitstring. Symbolically, this operation is denoted as (RR-bitstring & Node-bitstring). If the result of the operation is non-zero then the bit position of the node is set in the RR-bitstring, otherwise the bit position of the node is not set in the RR-bitstring.

2A. If the configured bit position of the node is found in the RR-bitstring, it means that the packet has traversed this node before and there is a loop somewhere in the network. In that case, the node drops the packet.

2B. If the configured bit position of the node is not found in the RR-bitstring, then the node makes a forwarding decision based on its forwarding table of the native packet forwarding protocol (e.g., IP, MPLS, Ethernet, or the like).

2B-1. If the destination address in the native header of the packet is a local address of this node, then it means that this node is the destination of the packet. Then, the node removes RR-bitstring from the packet.

2B-2. If the packet is to be forwarded, then the node performs the following operations. If the destination address belongs to a network locally connected to the node (e.g., a LAN or other similar locally connected network) then the node removes the RR-bitstring from the packet, otherwise the node sets its configured bit position in the RR-bitstring (i.e., performs a bitwise-OR operation on the RR-bitstring with the Node-bitstring, where this operation may be symbolically denoted as RR-bitstring=RR-bitstring | Node-bitstring). The node then forwards the packet to its designated next-hop.

In FIG. 5, a node does not include RR-bitstring in a packet when the packet is forwarded normally along the primary path R1→R2→R4. RR-bitstring is inserted by the node that fast-reroutes a packet (if it does not already include an RR-bitstring). As an example, assume that both the links R2-R4 and R3-R4 failed.

In this example, R1 sent the packet to R4 via R2. On receiving the packet, R2 makes a forwarding decision to R4 based on its routing table. Since the R2-R4 link has failed, R2 decided to fast-reroute the packet via backup next-hop R3. R2 inserts RR-bitstring into the packet and encodes its bit position 2 into RR-bitstring. The resultant packet with RR-bitstring={00010} is sent to R3.

In this example, R3 finds a RR-bitstring in the packet and as such, performs a bitwise-AND on RR-bitstring with its Node-bitstring 00100 to look for its bit position 3. Since R3 does not find its bit position in RR-bitstring, R3 makes a forwarding decision to R4 based on its forwarding table. Since the R3-R4 link has failed, R2 decided to fast-reroute the packet via backup next-hop R1. R3 sets its bit position 3 in RR-bitstring by performing a bitwise-OR of its Node-bitstring 00100 with RR-bitstring. The resultant packet with RR-bitstring={00110} is sent to R1.

In this example, on receiving the packet, R1 finds the RR-bitstring in the packet and, as such, looks for its bit position 1 in the RR-bitstring. Since its bit position is not found in RR-bitstring, it makes a forwarding decision to R2 based on its forwarding table. R1 sets its bit position 1 in RR-bitstring. The resultant packet with RR-bit-string={00111} is sent to R2.

In this example, on receiving the packet, R2 finds the RR-bitstring in the packet and, as such, looks for its bit position 2 in RR-bitstring. Since bit position 2 is set in RR-bitstring, R2 detects a loop and drops the packet.

It will be appreciated that, although the example in FIG. 5 illustrates enabling loop detection only during FRR, it is also possible to enable loop detection in the network by default. For example, if the operator of the network intends to protect against loops created by misbehavior of a node then the ingress node of the packet can always insert a RR-bitstring onto each packet. As a result, each subsequent node along the path of the packet will evaluate the RR-bitstring to check for loop and, if no loop is found, then will set its bit position onto the RR-bitstring before forwarding the packet. Additionally the RR-bitstring can be used by a receiving node of a packet to determine the set of nodes traversed by the packet.

If the number of nodes in the network is fairly small, then the overhead of the RR-bitstring should be tolerable. For example, if the maximum number of nodes in a network is 256, then the overhead of the RR-bitstring would be 256 bits=32B. If the overhead is tolerable by an operator, then the operator may choose to enable loop detection in the network by default i.e. an ingress node always pushes the RR-bitstring onto packets. Alternatively, if the overhead is not tolerable by an operator or the operator would prefer not to enable loop detection in the network by default, the operator may choose to selectively enable loop detection in response to one or more detected conditions (e.g., during network convergence scenarios, during FRR, or the like). It is further noted that, if loop detection is not enabled by default, then it is also possible that the operator of the network can administratively inject a test packet to R4 at the ingress node R1 or at any intermediate router, such that the packet includes the RR-bitstring, and if a loop is detected on the test packet by a node then the node may generate a loop detection notification with the details on the looping path. It will be appreciated that such test packets in IP networks could be Operations, Administration, and Maintenance (OAM) packets such as IP Ping (e.g., based on ICMP, ICMP-v6, or the like) or periodic multi-hop Bidirectional Forwarding Detection (BFD) packets to verify connectivity along an IP path.

If the number of nodes in the network is fairly large, then overhead of RR-bitstring may not be tolerable or desirable since the length of bitstring grows linearly with the number of nodes in the network. For example, if a network has 1024 nodes then RR-bitstring will consume 1024 bits. In at least some example embodiments, in order to eliminate this linear growth, a hierarchical loop detection scheme may be employed. In this scheme, the network is segregated into multiple areas wherein each area includes a disjoint subset of the nodes. For example, a network of 1024 nodes may be divided into 4 areas with 256 nodes each. Each area is assigned a unique area identifier (Area-ID). Then, the nodes in an area traversed by a RR-bitstring can be encoded as the tuple {Area-ID, bitstring}. When a packet leaves a first area and enters a second area, the egress node of the first area strips the bitstring and keeps only the Area-ID of the first area in the RR-bitstring. So, when a packet is traversing an area the RR-bitstring of a packet includes {Area-ID, bit-string} for the area and a list of Area-IDs for previously traversed areas. This construct is termed as "Multi-Area RR-bitstring" (MA-RR-bitstring), which is shown in FIG. 7.

FIG. 7 depicts an example embodiment of an MA-RR-bitstring format configured to support loop detection in multi-area packet switching networks.

As depicted in FIG. 7, the MA-RR-bitstring 700 includes a list of N area identifiers and a bitstring. More specifically, the MA-RR-bitstring 700 includes a list of area identifiers of areas previously traversed by the packet, as well as the area identifier of the area currently being traversed by the packet and the bitstring indicative of the nodes traversed by the packet within the area currently being traversed by the packet.

The use of an MA-RR-bitstring for loop detection may be further understood with respect to the following example. For example, if a packet has traversed Area-IDs 2 and 3 and is currently traversing across Area-ID 4, then the MA-RR-bitstring would be {Area-ID=2, Area-ID=3, {Area-ID=4, bitstring}}. This means that the packet previously traversed the areas associated with Area-ID=2 and Area-ID=3 and is currently traversing the area associated with Area-ID=4, with the bitstring indicating the nodes within the current area that have been traversed by the packet.

The use of an MA-RR-bitstring for loop detection may be performed as follows. If a node that receives a MA-RR-bitstring finds its designated Area-ID in MA-RR-bitstring and the bitstring is empty (meaning that the node is the ingress node for the packet entering the area), then it means that the packet has looped back to the area it had traversed before and, thus, the node drops the packet. If the node does not find its designated Area-ID in MA-RR-bitstring then it appends an {Area-ID, bitstring} tuple for its area and sets its own bit position into the bitstring.

The use of an MA-RR-bitstring for loop detection provides a hierarchical scheme such that the overhead of MA-RR-bitstring remains constant irrespective of the number of nodes in the network. The use of MA-RR-bitstring may be further understood by considering the example of FIG. 8.

Figure 8:
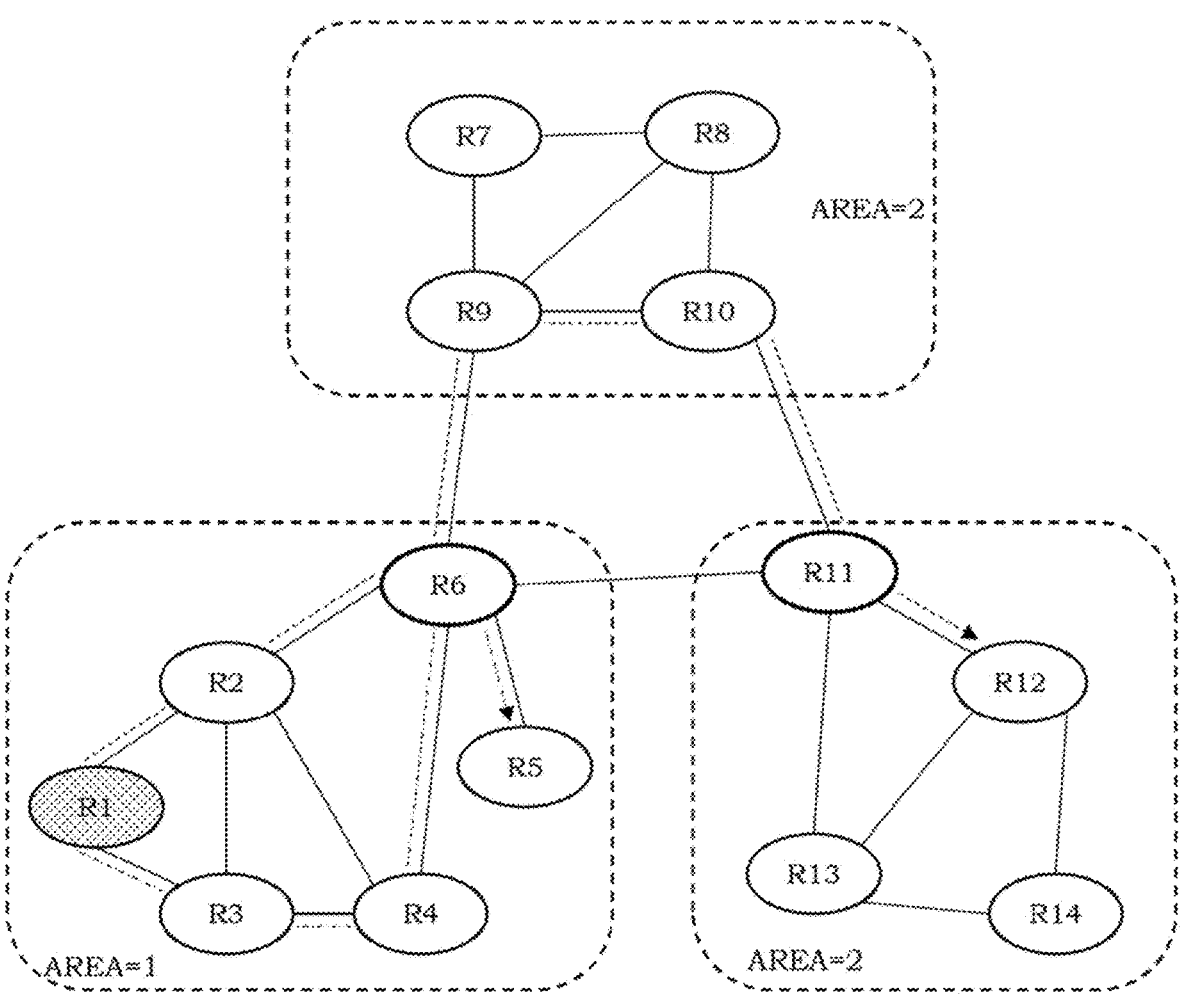
FIG. 8 depicts an example embodiment of a multi-area packet switching network for illustrating use of MA-RR-bitstring for loop detection.

FIG. 8 depicts an example embodiment of a multi-area packet switching network for illustrating use of MA-RR-bitstring for loop detection.

In FIG. 8, the multi-area packet switching network 800 includes fourteen nodes (denoted as R1-R14) which are grouped into three areas having Area-IDs 1, 2, and 3, respectively. More specifically, nodes RT-R6 are located within Area 1, nodes R7-R10 are located within Area 2, and nodes RTT-R14 are located within Area 3.

It will be appreciated that the areas may be defined in various ways, including based on operation of protocols within the network administratively from a central controller, or the like, as well as various combinations thereof. For example, if the multi-area packet switching network 800 is an IP network, then the areas could be Interior Gateway Protocol (IGP) areas or levels (e.g., based on OSPF, IS-IS, OSPFv3, or the like).

In FIG. 8, assume that the bit positions of the nodes are as follows. In Area 1, nodes R1-R6 are assigned bit positions 1-6 out of bit positions 1-8 of an eight-bit bitstring. In Area 2, nodes R7-R10 are assigned bit positions 1-4 out of bit positions 1-8 of an eight-bit bitstring. In Area 3, nodes R11-R14 are assigned bit positions 1-4 out of bit positions 1-8 of an eight-bit bitstring. It will be appreciated that the bit positions can overlap because the bitstring included within MA-RR-bitstring is the bitstring for the area in which the packet is currently located.

In FIG. 8, as an example, assume that a packet traverses from R1 to R12 along the path R1→R2→R6→R9→R10→R11→R12.

R1 originates the packet P with MA-RR-bitstring={Area-ID=1, bitstring=00000001} and sends the packet to R2. R2 sets its bit position 2 into the bitstring and sends the packet with MA-RR-bitstring={Area-ID=1, bitstring=00000011} to R6. R6 sets its bit position 6 into the bitstring and MA-RR-bitstring becomes {Area-ID=1, bitstring=00100011}. However, R6 needs to send the packet to R9 and R9 belongs to Area-ID=2. So, R6 is the egress node for Area-ID 1 and, as such, R6 strips the bitstring and sends the packet with MA-RR-bitstring={Area-ID=1} to R9.

When R9 receives the packet with MA-RR-bitstring={Area-ID=1}, it finds no entry for its designated Area-ID=2. So, R9 appends an entry for Area-ID=2 and sets its own bit position 3 in the bitstring for Area-ID=2. The MA-RR-bitstring is updated to {Area-ID=1, {Area-ID=2, bitstring=00000100}}. R9 sends the packet to R10. R10 sets its bit position 4 into bit string and the MA-RR-bitstring is updated to {Area-ID=1, {Area-ID=2, bitstring=00001100}}. R10 needs to send the packet to R11 and R11 belongs to Area-ID 3. So, R10 strips the bitstring of Area-ID=2 and sends the packet to R11 with MA-RR-bitstring={Area-ID=1, Area-ID=2}.

When R11 receives the packet with the MA-RR-bitstring={Area-ID=1, Area-ID=2}, it finds no entry for its designated Area-ID=3. So, R11 appends an entry for Area-ID 3 and sets its own bit position 1 in the bitstring for Area-ID 3. The MA-RR-bitstring is updated to {Area-ID=1, Area-ID=2, {Area-ID=3, bitstring=00000001}}. R11 sends the packet to R12. When R12 receives the packet, it finds that it is the destination of the packet. So, R12 removes the MA-RR-bitstring from the packet before performing further actions for the packet.

In this example, there is a forwarding loop along R6→R9→R10→R11→R6. In that case, R11 would send the packet to R6 instead of R12. Since R6 belongs to Area-ID 1, R11 removes the bitstring of its designated Area-ID 3. R11 sends the packet to R6 with MA-RR-bitstring={Area-ID=1, Area-ID=2, Area-ID=3}. When R6 receives the packet, R6 finds its designated Area-ID 1 in the MA-RR-bitstring. Since there is no bitstring associated with Area-ID 1, R6 determines that the packet had traversed Area-ID 1 before and is now looping back to Area-ID 1. So, R6 drops the packet on detection of the loop.

As may be seen from the examples provided above, various example embodiments of loop detection presented herein provide a generic and versatile loop detection mechanism that can be deployed in any context. For example, RR-bitstring is the most compact way of encoding a path traversed by a packet, such that minimal overhead on the packet is incurred. For example, operations performed by a forwarding node on the RR-bitstring is an O(1) operation. For example, this technique is a protocol independent technique, thereby providing a universal loop detection method that can be applicable to any packet switching technology. It will be appreciated that these and various other example embodiments and advantages or potential advantages of various example embodiments presented herein may be further understood by considering various aspects of example embodiments of loop detection as presented herein.

FIG. 9 depicts an example embodiment of a bitstring header configured for use as the bitstring portion of an RR-bitstring or an MA-RR-bitstring.

The bitstring header 900 includes a 3-bit Length (Len) field and a variable-length bit string field. The Length field indicates the length of the bit string field. The bit string field encodes the bit string with bit positions corresponding to nodes of the network that may be set in a manner indicative of the nodes that have been traversed by the packet.

The Length field may support encoding of values having specific meanings as follows. For example, a value of "0" (i.e., encoded as 000) may indicate that the bitstring header does not include the bit string field (e.g., this may be encoded after an Area-ID in an MA-RR-bitstring where the Area-ID has no bitstring. For example, a value of "1" (i.e., encoded as 001) may indicate that the length of the "bit string" field is 32 bits (supporting bit positions for 32 nodes). For example, a value of "2" (i.e., encoded as 010) may indicate that the length of the "bit string" field is 64 bits (supporting bit positions for 64 nodes). For example, a value of "3" (i.e., encoded as 011) may indicate that the length of the "bit string" field is 128 bits (supporting bit positions for 128 nodes). For example, a value of "4" (i.e., encoded as 100) may indicate that the length of the "bit string" field is 256 bits (supporting bit positions for 256 nodes).

It will be appreciated that, although primarily presented with respect to use of a 3-bit Length field supporting specific values indicative of specific bit string lengths, the Length field may be smaller or larger, the values defined for the Length field may be defined in various other ways, or the like, as well as various combinations thereof.

FIG. 10 depicts an example embodiment of a multi-area bitstring tuple configured for use in an MA-RR-bitstring.

The multi-area bitstring tuple 1000 includes a 5-bit Area Identifier (Area-ID) field and a variable-length bit string header. The Area-ID field encodes the area identifier of the current area in which the packet is located. The bit string header may be formatted as presented with respect to the bit string header 900 of FIG. 9, including a Length field and a variable-length bit string field that encodes the bit string with bit positions corresponding to nodes of the current area that may be set in a manner indicative of the nodes that have been traversed by the packet. It is noted that if an Area-ID does not have an associated bit string, then the Length field of the bit string header is encoded as "0". The combination of the Area-ID and the bit string provides a tuple {Area-ID, bitstring}.

It will be appreciated that, although primarily presented with respect to use of a 5-bit Area-ID field (supporting up to 32 areas), the Area-ID field may be smaller or larger depending on the number of areas that are supported or may need to be supported.

It will be appreciated that, for simplicity and without loss of generality, various example embodiments are primarily presented herein for the RR-bitstring rather than the MA-RR-bitstring, but that such example embodiments for the RR-bitstring may be extrapolated to cover example embodiments for the MA-RR-bitstring in the case of multi-area packet switching networks.

As discussed herein, in various example embodiments the RR-bitstring header may be encoded above the native header (e.g., when the native header is a Layer 3 header or a Layer 2.5 header or in other cases) or below the native header (e.g., when the native header is a Layer 2 header or in other cases).

In at least some example embodiments, the RR-bitstring header may be encoded within a packet above the native header of the packet and below the Layer 2 header of the packet (e.g., Ethernet or the like). In this case, the RR-bitstring header may be said to be independent of the native header. This may be used, for example, when the native header is a Layer 3 header (e.g., IPv4, IPv6, or the like) or a Layer 2.5 header (e.g., MPLS or the like). The encoding of the RR-bitstring header in this manner may be further understood by way of reference to FIG. 11 and FIG. 12.

FIG. 11 depicts an example embodiment of an RR-bitstring header configured to be encoded above a native header of a packet where an outer header is Ethernet or below a native header of a packet where the native header of the packet is Ethernet.

In FIG. 11, the RR-bitstring header 1100 is composed of the variable-length bitstring header (e.g., bit string header 900 of FIG. 9) followed by a 2-octet Ethertype field.

In the case in which the RR-bitstring header 900 is encoded above the native header of the packet (e.g., as presented with respect to FIG. 12), such that the native header may be a Layer 3 header (e.g., IPv4, IPv6, or the like) or a Layer 2.5 header (e.g., MPLS), the Ethertype field encodes the value that indicates the type of the lower layer native header. For example: (1) if the native header is IPv4 then the field is encoded with 0x800, (2) if the native header is IPv6 then the field is encoded with 0x86dd, or (3) if the native header is MPLS then the field is encoded with 0x8847 or 0x8848 depending on MPLS label type.

In the case in which the RR-bitstring header 900 is encoded below the native header of the packet where the native header of the packet is Ethernet (e.g., as presented with respect to FIG. 13), the Ethertype field encodes the value that indicates the upper layer protocol at the beginning of (i.e., just above) the Payload.

FIG. 12 depicts an example embodiment of a packet illustrating an encoding of an RR-bitstring header within the packet such that the RR-bitstring header is encoded above a native header of the packet where an outer header is Ethernet. In FIG. 12, the packet 1200 includes a payload, a native header above the payload, the RR-bitstring header above the native header, and an Ethernet Header above the RR-bitstring header. The 2-octet 'Ethertype' field in the Ethernet Header encodes the value that indicates that the RR-bitstring is the upper layer protocol. In the example embodiments presented herein, the value 0x81A is used to indicate that the RR-bitstring follows the Ethernet header; however, it will be appreciated that any suitable value may be used for this purpose. When a node receives an Ethernet packet in which the Ethertype field has a value indicative that the RR-bitstring header (e.g., the 0x81A value or any other suitable value) follows the Ethernet header, the node performs loop detection procedures based on the RR-bitstring header in the context of processing the native header.

In at least some example embodiments, the RR-bitstring header may be encoded within a packet below the native header of the packet where the native header of the packet is Ethernet. The encoding of the RR-bitstring header in this manner may be further understood by way of reference to FIG. 11 and FIG. 13.

FIG. 13 depicts an example embodiment of a packet illustrating an encoding of an RR-bitstring header within the packet such that the RR-bitstring header is encoded below a native header of the packet where the native header of the packet is Ethernet. In FIG. 13, the packet 1300 includes a payload, the RR-bitstring header above the payload, and the Ethernet Header (which is the native header) above the RR-bitstring header. Here, the RR-bitstring header is a lower layer protocol of the native Ethernet Header.

The 2-octet 'Ethertype' field in the Ethernet Header encodes the value that indicates that the RR-bitstring is the upper layer protocol at the beginning of the payload. In the example embodiments presented herein, the value 0x81B is used to indicate that the RR-bitstring follows the Ethernet header and is directly above the payload; however, it will be appreciated that any suitable value may be used for this purpose. When a node receives an Ethernet packet in which the Ethertype field has a value indicative that the RR-bitstring header (e.g., the 0x81A value or any other suitable value) follows the Ethernet header and is directly above the payload, the node performs loop detection procedures based on the RR-bitstring header in the context of processing the native header (which is the Ethernet header in this case).

In at least some example embodiments, the RR-bitstring header may be encoded within a packet below the native header of the packet where the native header of the packet is IP. When the native header is IP, the RR-bitstring header is inserted between the IP header and the IP payload (which begins with the transport/upper layer protocol header, such as Transmission Control Protocol (TCP), User Datagram Protocol (UDP), Internet Control Message Protocol (ICMP), or the like). The encoding of the RR-bitstring header in this manner may be further understood by way of reference to FIG. 14, FIG. 15, and FIG. 16.

FIG. 14 depicts an example embodiment of an RR-bitstring header configured to be encoded below a native header of a packet where the native header of the packet is IP. The RR-bitstring header 1400 is composed of the variable-length bitstring header (e.g., bit string header 900 of FIG. 9) followed by a 1-octet Protocol field. The Protocol field encodes the value that indicates the type of upper layer header in the payload. For example: (1) if the upper layer header is TCP then the field is encoded with a 6, (2) if the upper layer header is UDP then the field is encoded with a 17, and (3) if the upper layer header is ICMP then the field is encoded with a 2.

FIG. 15 depicts an example embodiment of a packet illustrating an encoding of an RR-bitstring header within the packet such that the RR-bitstring header is encoded below a native header of the packet where the native header of the packet is IPv4. In FIG. 15, the packet 1500 includes a payload, the RR-bitstring header above the payload, and the native IPv4 header above the RR-bitstring header. The Protocol field in the IPv4 header encodes a value that indicates the presence of the RR-bitstring header below the IPv4 header. In the example embodiments presented herein, the value 145 is used in the Protocol field to indicate that the RR-bitstring header follows the IPv4 header. When a node receives an IPv4 packet in which the Protocol field has a value indicative that the RR-bitstring header (e.g., the 145 value or any other suitable value) follows the IPv4 header (based on use of the Router Alert Option to enable any node along the path to examine the RR-bitstring header, as discussed further below), the node performs loop detection procedures based on the RR-bitstring header in the context of processing the IPv4 header. It will be appreciated that, depending on the manner in which the RR-bitstring-header is encoded with the packet, the RR-bitstring header also may be said to be encoded as an extension of the IPv4 header (e.g., using an IPv4 Option or the like).

FIG. 16 depicts an example embodiment of a packet illustrating an encoding of an RR-bitstring header within the packet such that the RR-bitstring header is encoded below a native header of the packet where the native header of the packet is IPv6. In FIG. 16, the packet 1600 includes a payload, the RR-bitstring header above the payload, and the native IPv6 header above the RR-bitstring header. The Next Header field in the IPv6 header encodes a value that indicates the presence of the RR-bitstring header below the IPv6 header. In the example embodiments presented herein, the value 145 is used in the Next Header field to indicate that the RR-bitstring header follows the IPv6 header. When a node receives an IPv6 packet in which the Next Header field has a value indicative that the RR-bitstring header (e.g., the 145 value or any other suitable value) follows the IPv6 header (based on use of the Router Alert Option to enable any node along the path to examine the RR-bitstring header, as discussed further below), the node performs loop detection procedures based on the RR-bitstring header in the context of processing the IPv6 header. It will be appreciated that, depending on the manner in which the RR-bitstring-header is encoded with the packet, the RR-bitstring header also may be said to be encoded as an extension of the IPv6 header (e.g., using an IPv6 Extension Header or the like).

It is noted that, as per the rules in the IPv4 Specification and the IPv6 Specification, the only router that typically is allowed to inspect a protocol below the IP header is either the node that corresponds to the destination indicated in the destination address field in the IP header or any node along the path if the Router Alert Option is set in the IP header. Accordingly, in order to perform loop detection at any node traversed by a packet, whenever the RR-bitstring header is included in an IP packet as the lower layer protocol, the Router Alert Option may be set in the IP Header so that any node traversed by the packet can process the RR-bitstring header in order to perform loop detection.

In at least some example embodiments, as indicated above, when the RR-bitstring header is included in a packet in which IPv4 is the native protocol, the RR-bitstring header may be encoded as an extension of the IPv4 Header by encoding the RR-bitstring header as an IPv4 Option (i.e., as an extension of the native header).

FIG. 17 depicts an example embodiment of an IPv4 Header including an IPv4 Option encoding an RR-bitstring header. As depicted in FIG. 17, the IPv4 Header 1700 includes an RR-bitstring header encoded within an IPv4 Option. It will be appreciated that the encoding of the RR-bitstring header within the IPv4 Option of the IPv4 Header may be considered to be encoding of the RR-bitstring header as an extension of the native IPv4 header where IPv4 is the native header of the packet.

The IPv4 Options provide for control functions needed or useful in some situations, but generally unnecessary for the most common communications. For example, the IPv4 Options include provisions for timestamps, security, and special routing.

The IPv4 Option starts with a 1-octet Type field followed by a type specific encoding. IPv4 Options are of variable length. Thus, the minimum size of an Option is 1-octet (only the type field is included) if it does not have any type specific data. The maximum size of an IPv4 Option is limited by the maximum permissible value of IHL field in the IPv4 Header.

The 1-octet Type field of the IPv4 Option is viewed as having 3 fields as follows: (1) a 1-bit copied flag, (2) a 2-bit option class, and (3) a 5-bit option number. The copied flag indicates whether this option is copied into all fragments in fragmentation (e.g., "0"=not copied while "1"=copied). The option classes are: (a) 0=control, (b) 1=reserved for future use, (c) 2=debugging and measurement, and (d) 3=reserved for future use.

In at least some example embodiments, a new IPv4 Option may be defined to encode the RR-bitstring header. This IPv4 Option may be referred to as an RR-bitstring Option. The RR-bitstring Option may be defined as depicted in FIG. 18.

FIG. 18 depicts an example embodiment of an IPv4 Option, referred to as an RR-bitstring Option, defined to encode an RR-bitstring header. As depicted in FIG. 18, the RR-bitstring Option 1800 includes a Type field and a bitstring header field. The Type field is a 1-octet field that indicates the RR-bitstring Option in tuples of COPY, CLASS and NUMBER, which is 159 in this example (although it will be appreciated that other suitable values may be used). The Copy bit is 1, which means that the RR-bitstring Option will be copied into all fragments, in case the IPv4 packet carrying the option is fragmented by a router. The bitstring header field encodes the RR-bitstring header (e.g., bit string header 900 of FIG. 9).

In at least some example embodiments, as indicated above, when the RR-bitstring header is included in a packet in which IPv6 is the native protocol, the RR-bitstring header may be encoded as an extension of the IPv6 Header by encoding the RR-bitstring header as an IPv6 EH (i.e., as an extension of the native header).

FIG. 19 depicts an example embodiment of an IPv6 packet including an IPv6 Header having IPv6 Extension Headers including an IPv6 Extension header encoding an RR-bitstring header. As depicted in FIG. 19, the IPv6 packet 1900 includes an IPv6 header and an associated payload, where the IPv6 header includes an RR-bitstring header encoded within an IPv6 EH. It will be appreciated that the encoding of the RR-bitstring header within the IPv6 EH of the IPv6 Header may be considered to be encoding of the RR-bitstring header as an extension of the native IPv6 header where IPv6 is the native header of the packet.

The main IPv6 header remain fixed in size (40 bytes) while customized EHs are added as needed. The EHs provide for control functions needed or useful in some situations, but unnecessary for the most common communications. For example, the EHs include provisions for timestamps, security, and special routing.

In IPv6, each EH starts with a 1-octet Next Header field, followed by its own body. The format of the body is dependent on the type of EH. The Next Header field of an EH points to the type of the next EH. So, multiple EHs are chained together by their Next Header fields as shown in FIG. 19. The Next Header field on the last EH in the chain indicates the type of the IPv6 payload.

In IPv6, the EH referred to as the "Hop-by-Hop Options Header" can be used to carry optional information that must be examined by every router along the delivery path of the packet. It is identified by the value of 0 in the Next Header field of the IPv6 Header. This EH is generic and multiple options can be defined within it. So, any special directive to be examined by every transit router of an IPv6 packet is defined as an option within the Hop-by-Hop Options Header, including the RR-bitstring header.

FIG. 20 depicts an example embodiment of an IP Hop-by-Hop Options Header configured to encode an RR-bit-string header. As depicted in FIG. 20, the Hop-by-Hop Options Header 2000 includes a Next Header field, a Header Extension Length field, and an Options field. The Next Header field is an 8-bit selector that identifies the type of header immediately following the Hop-by-Hop Options header. The Header Extension Length field is an 8-bit unsigned integer that indicates the length of the Hop-by-Hop Options header in 8-octet units, not including the first 8 octets. The Options field is a variable-length field, of length such that the complete Hop-by-Hop Options header is an integer multiple of 8 octets long, which includes one or more TLV-encoded options, which may be used to encode the RR-bitstring header.

FIG. 21 depicts an example embodiment of a Type-Length-Value (TLV) encoded Option for a Hop-by-Hop Options Header where the TLV encoded Option is config-ured to encode an RR-bitstring header. The TLV encoded Option 2100 for the Hop-By-Hop Options header includes an Option Type field, an Option Data Length (Opt Data Len) field, and an Option Data field. The Option Type field includes an 8-bit identifier of the type of option. The Option Data Length field is an 8-bit unsigned integer which indi-cates the length of the Option Data field of the option (in octets). The Option Data field is a variable-length field that includes Option-Type-specific data.

It will be appreciated that the sequence of options within a header generally must be processed strictly in the order they appear in the header; a receiver should not, for example, scan through the header looking for a particular kind of option and process that option prior to processing all pre-ceding options.

The Option Type identifiers are internally encoded such that their highest-order two bits specify the action that must be taken if the processing IPv6 node does not recognize the Option Type. For example, a value of "00" means skip over this option and continue processing the header. For example, a value of "01" means discard the packet. For example, a value of "10" means discard the packet and, regardless of whether or not the Destination Address of the packet was a multicast address, send an ICMP Parameter Problem, Code 2, message to the Source Address of the packet, pointing to the unrecognized Option Type. For example, a value of "11" means discard the packet and, only if the Destination Address of the packet was not a multicast address, send an ICMP Parameter Problem, Code 2, message to the Source Address of the packet, pointing to the unrecognized Option Type.

The third-highest-order bit of the Option Type specifies whether or not the Option Data of that option can change en-route to the final destination of the packet. When an Authentication header (another type of EH that carries an authentication digest of the packet) is present in the packet, for any option whose data may change en-route, its entire Option Data field must be treated as zero-valued octets when computing or verifying the packet's authenticating digest. Here, a value of "0" may indicate that the Option Data does not change en-route, whereas a value of "1" may indicate that the Option Data may change en-route.

It is noted that the three high-order bits described above are to be treated as part of the Option Type, not independent of the Option Type. That is, a particular option is identified by a full 8-bit Option Type, not just the low-order 5 bits of an Option Type.

In at least some example embodiments, a new IPv6 EH may be defined to encode the RR-bitstring header. This IPv6 EH may be referred to as an RR-bitstring Option. The RR-bitstring Option may be defined as depicted in FIG. 22.

FIG. 22 depicts an example embodiment of an RR-bitstring Option configured to encode an RR-bitstring header within a Hop-by-Hop Options header. As depicted in FIG. 22, the RR-bitstring Option 2200 includes an Option Type field, an Option Data Length (Opt Data Len) field, and a bit string header field.

The Option Type field is an 8-bit field that encodes the option type that indicates that the Option is an RR-bitstring option. The highest-order 2-bits are encoded with the value 00, which means skip over this option and continue pro-cessing the header (meaning that, if a receiver does not recognize the RR option, then the receiver should ignore the RR option). The $_3$rd highest order bit is encoded with the following value 1, which indicates that the option data may change en-route, because the contents of the RR-bitstring changes at each hop/router. The remaining 5-bits are assigned the value 10010. This results in the value of Option Type field as 0x32.

The Option Data Length (Opt Data Len) field encodes a value that is variable and indicates the length of the remain-ing bytes in the RR-bitstring option.

The bit string header field encodes the RR-bitstring header (e.g., the RR-bitstring as presented in FIG. 9).

FIG. 23 depicts an example embodiment of a method for use by a node, configured to support loop detection, to process a packet. It will be appreciated that, although primarily presented herein as being performed serially, at least a portion of the functions of method 2300 may be performed contemporaneously or in a different order than as presented in FIG. 23. At block 2301, the method 2300 begins. The input to method 2300, as indicated by block 2302, is a packet. Block 2305 checks if there is an RR-bitstring included in the packet. If an RR-bitstring is present in the packet then the method 2300 proceeds to block 2310, otherwise the method 2300 proceeds to block 2320. Block 2310 performs loop detection based on the received RR-bitstring, and then the method 2300 proceeds to block 2315. Block 2315 checks if a loop was detected in block 2310. If no loop was detected in block 2310 then the method 2300 proceeds to block 2320, otherwise the method 2300 pro-ceeds to block 2355. Block 2320 looks up the destination address of the packet in the forwarding table, and then the method 2300 proceeds to block 2325. Block 2325 checks if the next-hop indicates that the destination address belongs to this node. If the next-hop does not indicate that the desti-nation address belongs to this node then the method 2300 proceeds to block 2330, otherwise the method 2300 proceeds to block 2345. Block 2330 checks if the next-hop is a local network. This would be the case when the destination address is included in the subnet assigned to the locally connected network. If the next-hop is a local network then the method 2300 proceeds to block 2335, otherwise the method 2300 proceeds to block 2340. Block 2335 removes the RR-bitstring (if present) from the packet, and then the method 2300 proceeds to block 2340. Block 2340 forwards the packet to the next-hop, and then the method 2300 proceeds to block 2399 where the method 2300 ends. Block 2345 removes the RR-bitstring (if present) from the packet, and then the method 2300 proceeds to block 2350. Block 2350 processes the payload as per the payload protocol, and then the method 2300 proceeds to block 2399 where the method 2300 ends. Block 2355 is reached when a loop was detected for the packet. Block 2355 checks if detection of the loop needs to be notified and, if detection of the loop needs to be notified, then a notification for the loop is generated, and then the method 2300 proceeds to block 2360. Block 2360 drops the packet, and then the method 2300 proceeds to block 2399 where the method 2300 ends. At block 2399, the method 2300 ends. It will be appreciated that, although the method 2300 of FIG. 23 is for the case of a single area, the method 2300 of FIG. 23 may be extrapolated for a network with multiple areas.

FIG. 24 depicts an example embodiments of a method for use by a node for performing loop detection for a received packet. It will be appreciated that the method 2400 of FIG. 24 may be used as block 2310 of the method 2300 of FIG. 23. It will be appreciated that, although primarily presented herein as being performed serially, at least a portion of the functions of method 2400 may be performed contemporaneously or in a different order than as presented in FIG. 24. At block 2401, the method 2400 begins. The input to method 2400, as indicated by block 2402, is an RR-bitstring. Block 2410 builds the Node-bitstring for the node, and then the method proceeds to block 2420. Block 2420 performs a bitwise-AND operation between the RR-bitstring and the Node-bitstring. If the result of the bitwise-AND operation is non-zero then the method 2400 proceeds to block 2430, otherwise the method 2400 proceeds to block 2499 where the method 2400 ends. Block 2430 declares a loop for the packet, and then the method 2400 proceeds to block 2499 where the method 2400 ends. At block 2499, the method 2400 ends.

FIG. 25 depicts an example embodiment of a method for use by a node for forwarding a packet to a next-hop. It will be appreciated that the method 2500 of FIG. 25 may be used as block 2340 of the method 2300 of FIG. 23. It will be appreciated that, although primarily presented herein as being performed serially, at least a portion of the functions of method 2500 may be performed contemporaneously or in a different order than as presented in FIG. 25. At block 2501, the method 2500 begins. The inputs to method 2500, as indicated by block 2502, are the packet and the next-hop on which to forward the packet. Block 2510 checks if loop detection is enabled. This check may be based upon various criteria, such as whether loop detection is required by default, if required during FRR then whether the next-hop is the backup next-hop, if required for test/OAM packets whether the packet is an OAM packet, or the like, as well as various combinations thereof. It will be appreciated that various other criteria may be used. If loop detection is enabled then the method 2500 proceeds to block 2520, otherwise the method 2500 proceeds to block 2560. Block 2520 checks if RR-bitstring is already included in the packet. If RR-bitstring is not already included in the packet then the method 2500 proceeds to block 2530, otherwise the method 2500 proceeds to block 2540. Block 2530 inserts an empty RR-bitstring into the packet, and then the method 2500 proceeds to block 2540. Block 2540 builds Node-bitstring for the node and then the method 2500 proceeds to block 2550. Block 2550 performs a bitwise-OR of the Node-bitstring and the RR-bitstring (i.e., sets the bit position of the node in RR-bitstring), and then the method 2500 proceeds to block 2560. Block 2560 sends the packet to the next-hop, and then the method 2500 proceeds to block 2599 where the method 2500 ends. At block 2599, the method 2500 ends.

FIG. 26 depicts an example embodiment of a method for supporting loop detection in a communication network. It will be appreciated that, although primarily presented herein as being performed serially, at least a portion of the functions of method 2600 may be performed contemporaneously or in a different order than as presented in FIG. 26. At block 2601, the method 2600 begins. At block 2610, support communication of a packet within a network including a set of nodes configured to operate on the packet using a protocol, wherein the packet includes a payload and a native header of the protocol, wherein the packet includes a recorded route header including a recorded route bit string having a set of bit positions associated with the respective nodes of the network, wherein the bit positions of the recorded route bit string are set in a manner indicative as to which of the nodes of the network have been traversed by the packet, wherein the recorded route header is located within or adjacent to the native header of the protocol. At block 2699, the method 2600 ends.

FIG. 27 depicts an example embodiment of a method for supporting loop detection in a communication network. It will be appreciated that, although primarily presented herein as being performed serially, at least a portion of the functions of method 2700 may be performed contemporaneously or in a different order than as presented in FIG. 27. At block 2701, the method 2700 begins. At block 2710, determine, for a packet, that loop detection is to be supported for the packet within a network including a set of nodes configured to operate on the packet using a protocol, wherein the packet includes a payload and a native header of the protocol. At block 2720, insert, within the packet to form a modified packet, a recorded route header including a recorded route bit string having a set of bit positions associated with the respective nodes of the network, wherein the bit positions of the recorded route bit string are configured to be set in a manner indicative as to which of the nodes of the network have been traversed by the packet, wherein the recorded route header is located within or adjacent to the native header of the protocol. At block 2730, send the modified packet toward a next-hop node of the network. At block 2799, the method 2700 ends.

FIG. 28 depicts an example embodiment of a method for supporting loop detection in a communication network. It will be appreciated that, although primarily presented herein as being performed serially, at least a portion of the functions of method 2800 may be performed contemporaneously or in a different order than as presented in FIG. 28. At block 2801, the method 2800 begins. At block 2810, receive a packet within a network including a set of nodes configured to operate on the packet using a protocol, wherein the packet includes a payload and a native header of the protocol, wherein the packet includes a recorded route header including a recorded route bit string having a set of bit positions associated with the respective nodes of the network, wherein the bit positions of the recorded route bit string are set in a manner indicative as to which of the nodes of the network have been traversed by the packet, wherein the recorded route header is located within or adjacent to the native header of the protocol. At block 2820, determine, based on the recorded route header within the context of processing the native header of the protocol, whether the packet has traversed a loop within the network. At block 2899, the method 2800 ends.

FIG. 29 depicts an example embodiment of a method for supporting loop detection in a communication network composed of multiple areas. It will be appreciated that, although primarily presented herein as being performed serially, at least a portion of the functions of method 2900 may be performed contemporaneously or in a different order than as presented in FIG. 29. At block 2901, the method 2900 begins. At block 2910, support communication of a packet within a network, wherein the network includes a set of areas including respective sets of nodes, wherein the packet includes a recorded route header, wherein the recorded route header includes a first area identifier of a first one of the areas traversed by the packet, wherein the recorded route header includes a second area identifier of a second one of the areas currently being traversed by the packet, wherein the recorded route header includes a recorded route bit string having a set of bit positions associated with the respective nodes in the set of nodes of the second one of the areas, wherein the bit positions of the recorded route bit string are set in a manner indicative as to which of the nodes in the set of nodes of the second one of the areas have been traversed by the packet. At block 2999, the method 2900 ends.

FIG. 30 depicts an example embodiment of a method for supporting loop detection in a communication network composed of multiple areas. It will be appreciated that, although primarily presented herein as being performed serially, at least a portion of the functions of method 3000 may be performed contemporaneously or in a different order than as presented in FIG. 30. At block 3001, the method 3000 begins. At block 3010, receive, at anode configured to operate as an egress point from a first area of a network to a second area of the network, a packet including a recorded route header, wherein the recorded route header includes an area identifier of the first area and a recorded route bitstring having a set of bit positions associated with a respective subset of nodes of the network included within the first area, wherein the bit positions of the bit string are set in a manner indicative as to which of the nodes of the first area have been traversed by the packet. At block 3020, update, by the node, the recorded route header of the packet to form a modified packet, wherein the update of the recorded route header includes removing the recorded route bitstring from the recorded route header. At block 3030, send, by the node toward a next-hop node of the second area, the modified packet. At block 3099, the method 3000 ends.

FIG. 31 depicts an example embodiment of a method for supporting loop detection in a communication network composed of multiple areas. It will be appreciated that, although primarily presented herein as being performed serially, at least a portion of the functions of method 3100 may be performed contemporaneously or in a different order than as presented in FIG. 31. At block 3101, the method 3100 begins. At block 3110, receive, from an upstream node in a first area of a network by a node configured to operate as an ingress point into a second area of the network, a packet including a recorded route header, wherein the recorded route header includes a first area identifier of the first area of the network. At block 3120, update, by the node, the recorded route header of the packet to form a modified packet, wherein the update of the recorded route header includes inserting a second area identifier of the second area and inserting a recorded route bitstring having a set of bit positions associated with a respective subset of nodes of the network included within the second area, wherein the bit position of the bit string corresponding to the node is set in a manner indicative that the packet has traversed the node. At block 3130, send, by the node toward a next-hop node of the second area, the modified packet. At block 3199, the method 3100 ends.

Various example embodiments for supporting loop detection in a communication network may provide various advantages or potential advantages. For example, various example embodiments for supporting loop detection in a communication network may be configured to support universal loop detection for providing loop detection within various types of communication networks, for communications based on various types of communication protocols, or the like, as well as various combinations thereof. For example, various example embodiments for supporting loop detection in a communication network may be configured to support loop detection in a manner that enables detection of the loop when the loop forms so that packets do not circulate within the loop multiple times (thereby consuming network resources) before being detected. For example, various example embodiments for supporting loop detection in a communication network may be configured to support loop detection for various types of loops (e.g., micro-loops and macro-loops) which may form under various types of conditions (e.g., network convergence, FRR operations, misbehaving routers, or the like). Various example embodiments for supporting loop detection in a communication network may provide various other advantages or potential advantages.

FIG. 32 depicts an example embodiment of a computer suitable for use in performing various functions presented herein.

The computer 3200 includes a processor 3202 (e.g., a central processing unit (CPU), a processor, a processor having a set of processor cores, a processor core of a processor, or the like) and a memory 3204 (e.g., a random access memory (RAM), a read-only memory (ROM), or the like). In at least some example embodiments, the computer 3200 may include at least one processor and at least one memory storing instructions that, when executed by the at least one processor, cause the computer to perform various functions presented herein.

The computer 3200 also may include a cooperating element 3205. The cooperating element 3205 may be a hardware device. The cooperating element 3205 may be a process that can be loaded into the memory 3204 and executed by the processor 3202 to implement various functions presented herein (in which case, for example, the cooperating element 3205 (including associated data structures) can be stored on a non-transitory computer readable medium, such as a storage device or other suitable type of storage element (e.g., a magnetic drive, an optical drive, or the like)).

The computer 3200 also may include one or more input/output devices 3206. The input/output devices 3206 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 3200 may represent a general architecture and functionality suitable for implementing functional elements described herein, portions of functional elements described herein, or the like, as well as various combinations thereof. For example, computer 3200 may provide a general architecture and functionality that is suitable for implementing one or more elements presented herein. For example, computer 3200 may provide a general architecture and functionality suitable for implementing a node (e.g., a router or other node supporting communication of packets) or a portion thereof, a controller or a portion thereof, or the like.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory storing instructions that, when executed by the at least one processor, cause the apparatus at least to:
receive a packet within a network including a set of nodes configured to operate on the packet using a protocol, wherein the packet includes a payload and a native header of the protocol, wherein the packet includes a recorded route header including a recorded route bit string having a set of bit positions associated with the respective nodes of the network, wherein the bit positions of the recorded route bit string are set in a manner indicative as to which of the nodes of the network have been traversed by the packet, wherein the recorded route header is located within or adjacent to the native header of the protocol; and
determine, based on the recorded route header within the context of processing the native header of the protocol, whether the packet has traversed a loop within the network.

2. The apparatus of claim 1, wherein the recorded route header is located adjacent to the native header of the protocol.

3. The apparatus of claim 1, wherein the recorded route header is located above the payload and below the native header of the protocol.

4. The apparatus of claim 1, wherein the recorded route header is located above the payload and above the native header of the protocol.

5. The apparatus of claim 1, wherein the recorded route header is located within the native header.

6. The apparatus of claim 1, wherein the protocol is a layer 3 protocol or a layer 2.5 protocol, wherein the recorded route header is located above the native header of the protocol.

7. The apparatus of claim 6, wherein the packet further includes a layer 2 protocol header above the recorded route header.

8. The apparatus of claim 6, wherein the packet further includes an Ethernet header above the recorded route header, wherein an Ethertype field of the Ethernet header is configured to indicate a presence of the recorded route header below the Ethernet header.

9. The apparatus of claim 6, wherein the recorded route header includes a bitstring header field encoding the recorded route bitstring and an Ethernet type field configured to indicate a presence of the native header of the protocol below the recorded route header.

10. The apparatus of claim 1, wherein the protocol is Ethernet and the native header is an Ethernet header, wherein an Ethertype field of the Ethernet header is configured to indicate a presence of the recorded route header below the Ethernet header.

11. The apparatus of claim 10, wherein the recorded route header includes a bitstring header field encoding the recorded route bitstring and an Ethernet type field configured to indicate a presence of the payload below the recorded route header.

12. The apparatus of claim 1, wherein the protocol is an Internet Protocol (IP), wherein the recorded route header is located within an IP Header.

13. The apparatus of claim 12, wherein the protocol is IP version 4 (IPv4), wherein the recorded route header is located within an IPV4 Option of the IPV4 Header.

14. The apparatus of claim 13, wherein the IPV4 Header includes a Protocol field configured to indicate a presence of the recorded route header within the IPV4 Header.

15. The apparatus of claim 12, wherein the protocol is IP version 6 (IPv6), wherein the recorded route header is located within an IPV6 Extension Header of the IPV6 Header.

16. The apparatus of claim 15, wherein the IPV6 Header includes a Next Header field configured to indicate a presence of the recorded route header within the IPV6 Header.

17. The apparatus of claim 12, wherein the recorded route header includes a bitstring header field encoding the recorded route bitstring and a Protocol field configured to indicate a type of an upper layer header in the payload.

18. The apparatus of claim 17, wherein the type of the upper layer header in the payload includes one of Transmission Control Protocol (TCP), User Datagram Protocol (UDP), or Internet Control Message Protocol.

19. The apparatus of claim 1, wherein the recorded route header includes a bit string field encoding the recorded route bitstring and a length field encoding an indication of a length of the bit string field.

20. The apparatus of claim 1, wherein, to determine whether the packet has traversed a loop within the network, the instructions, when executed by the at least one processor, cause the apparatus at least to:

perform, by one of the nodes that received the packet based on the recorded route header and a node bitstring configured to indicate a bit position of the one of the nodes within the recorded route header, a logical operation to determine whether the packet previously traversed the one of the nodes.

21. The apparatus of claim 1, wherein the instructions, when executed by the at least one processor, cause the apparatus at least to:

support, based on a determination that the packet has not traversed a loop within the network, forwarding of the packet based on the native header of the protocol.

22. The apparatus of claim 1, wherein the instructions, when executed by the at least one processor, cause the apparatus at least to:

initiate, based on a determination that the packet has not traversed a loop within the network, an action configured to prevent further looping of the packet within the network.

23. An apparatus, comprising:

at least one processor, and at least one memory storing instructions that, when executed by the at least one processor, cause the apparatus at least to:

receive, at a node configured to operate as an egress point from a first area of a network to a second area of the network, a packet including a recorded route header, wherein the recorded route header includes an area identifier of the first area and a recorded route bitstring having a set of bit positions associated with a respective subset of nodes of the network included within the first area, wherein the bit positions of the bit string are set in a manner indicative as to which of the nodes of the first area have been traversed by the packet;

update, by the node, the recorded route header of the packet to form a modified packet, wherein the update of the recorded route header includes removing the recorded route bitstring from the recorded route header; and send, by the node toward a next-hop node of the second area, the modified packet.

24. An apparatus, comprising:

at least one processor; and at least one memory storing instructions that, when executed by the at least one processor, cause the apparatus at least to:

receive, from an upstream node in a first area of a network by a node configured to operate as an ingress point into a second area of the network, a packet including a recorded route header, wherein the recorded route header includes a first area identifier of the first area of the network;

update, by the node, the recorded route header of the packet to form a modified packet, wherein the update of the recorded route header includes inserting a second area identifier of the second area and inserting a recorded route bitstring having a set of bit positions associated with a respective subset of nodes of the network included within the second area, wherein the bit position of the bit string corresponding to the node is set in a manner indicative that the packet has traversed the node; and send, by the node toward a next-hop node of the second area, the modified packet.

* * * * *